(12) United States Patent
Cansino et al.

(10) Patent No.: US 10,798,463 B2
(45) Date of Patent: Oct. 6, 2020

(54) METHOD AND SYSTEM OF NOTIFYING USERS USING AN IN-VEHICLE INFOTAINMENT SYSTEM

(71) Applicant: The DIRECTV Group, Inc., El Segundo, CA (US)

(72) Inventors: Don E. Cansino, Redondo Beach, CA (US); Stephen H. Chu, Sherman Oaks, CA (US); Bhavyank V. Shah, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 29 days.

(21) Appl. No.: 14/982,988

(22) Filed: Dec. 29, 2015

(65) Prior Publication Data
US 2017/0188110 A1  Jun. 29, 2017

(51) Int. Cl.
| | |
|---|---|
| H04N 21/41 | (2011.01) |
| H04N 21/414 | (2011.01) |
| H04N 21/488 | (2011.01) |
| H04M 1/60 | (2006.01) |
| H04N 21/4227 | (2011.01) |
| H04N 21/214 | (2011.01) |
| H04N 21/40 | (2011.01) |
| H04N 21/472 | (2011.01) |

(52) U.S. Cl.
CPC ...... *H04N 21/4882* (2013.01); *H04M 1/6075* (2013.01); *H04N 21/4122* (2013.01); *H04N 21/41422* (2013.01); *H04N 21/4227* (2013.01)

(58) Field of Classification Search
None
See application file for complete search history.

(56) References Cited

U.S. PATENT DOCUMENTS

| | | | |
|---|---|---|---|
| 2006/0230427 A1* | 10/2006 | Kunkel | H04N 21/435 725/133 |
| 2007/0120948 A1* | 5/2007 | Fujioka | H04M 1/66 348/14.01 |
| 2010/0033312 A1* | 2/2010 | Chauncey | H04M 1/6075 340/438 |
| 2011/0185390 A1* | 7/2011 | Faenger | G01C 21/3688 725/75 |
| 2011/0212737 A1* | 9/2011 | Isidore | H04M 1/72519 455/466 |
| 2013/0151111 A1* | 6/2013 | Skelton | B60R 16/02 701/99 |
| 2013/0274997 A1* | 10/2013 | Chien | G06F 17/00 701/36 |
| 2014/0149305 A1* | 5/2014 | Aziz | G01C 21/00 705/326 |

(Continued)

*Primary Examiner* — Brian T Pendleton
*Assistant Examiner* — Jean D Saint Cyr
(74) *Attorney, Agent, or Firm* — Guntin & Gust, PLC; Ralph Trementozzi

(57) ABSTRACT

A system and method for notifying a user of various events through the in-vehicle system while suppressing notifications at a mobile device or a wearable device includes the mobile device and the in-vehicle infotainment system in communication with the mobile device. The mobile device receives a notification signal, suppresses displaying the notification signal and communicates the notification signal to the in-vehicle infotainment system. The in-vehicle infotainment system displays the notification signal on a screen display.

21 Claims, 26 Drawing Sheets

(56) References Cited

U.S. PATENT DOCUMENTS

| | | | | |
|---|---|---|---|---|
| 2014/0189353 A1* | 7/2014 | Apsangi | ............... | H04L 63/20 |
| | | | | 713/168 |
| 2014/0280580 A1* | 9/2014 | Langlois | ............ | B60K 37/06 |
| | | | | 709/204 |
| 2015/0004946 A1* | 1/2015 | Schmidt | ............... | H04L 51/22 |
| | | | | 455/412.2 |
| 2016/0202944 A1* | 7/2016 | Dent | ................ | G06F 3/038 |
| | | | | 345/156 |

* cited by examiner

METHOD AND SYSTEM OF NOTIFYING USERS USING AN IN-VEHICLE INFOTAINMENT SYSTEM

TECHNICAL FIELD

The present disclosure relates generally to television distribution systems and, more specifically, to a method and system for notifying users of an infotainment system of reminders or recommended content.

BACKGROUND

The statements in this section merely provide background information related to the present disclosure and may not constitute prior art.

Television programming content providers are increasingly providing a wide variety of content to consumers. Available content is typically displayed to the user using a grid guide. The grid guide typically includes channels and timeslots as well as programming information for each information timeslot. The programming information may include the content title and other identifiers such as actor information and the like.

Providing convenient ways for users to select and find content is useful to content providers. Mobile phones are have been used to order content and watch content. Wearable devices such as computer watches and head mounted computers are increasing in popularity. Utilizing such devices in the control of content would increase customer satisfaction.

While users of a content delivery system are travelling in a vehicle, notifying the users of different events is difficult. Notifications on a mobile device may not be received due to road noise or the volume of the vehicle audio system. Users checking for messages on a mobile device may provide a source of distraction for the driver.

SUMMARY

The present disclosure provides a system and method for notifying a user of various events through the in-vehicle system while suppressing notifications at a mobile device or a wearable device.

In one aspect of the disclosure, a method comprises coupling a mobile device to an in-vehicle infotainment system, communicating a notification signal to the mobile device, suppressing displaying the notification signal at the mobile device, communicating the notification signal from the mobile device to the in-vehicle infotainment system and displaying the notification signal on a screen display of the in-vehicle infotainment system.

In a further aspect of the disclosure, a system comprises a mobile device and an in-vehicle infotainment system in communication with the mobile device. The mobile device receives a notification signal, suppresses displaying the notification signal and communicates the notification signal to the in-vehicle infotainment system. The in-vehicle infotainment system displays the notification signal on a screen display.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
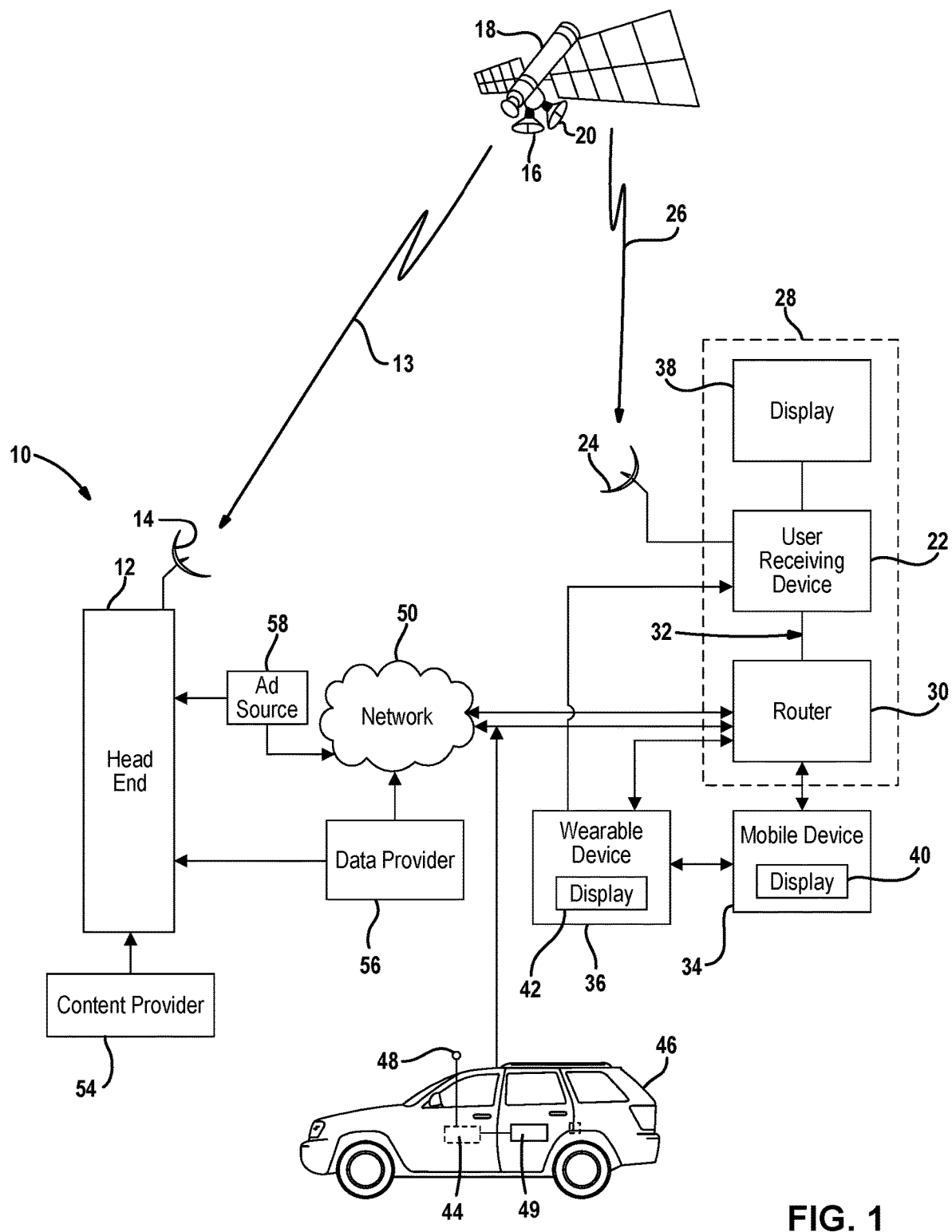
FIG. 1 is a block diagrammatic view of a communication system according to one example of the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented electronically in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals 26 that are directed to a user receiving device 22. The user receiving device 22 may be located within a building 28 such as a home, multi-unit dwelling or business. The user receiving device 22 is in communication with an antenna 24. The antenna 24 receives downlink signals 26 from the transmitting antenna 20 of the satellite 18. Thus, the user receiving device 22 may be referred to as a satellite television receiving device. However, the system has applicability in non-satellite applications such as a wired or wireless terrestrial system. For example, broadband wired or optical systems may benefit from the teachings set forth herein. Therefore the user receiving device 22 may be referred to as a television receiving device, set top box, home media center or home gateway. More than one user receiving device 22 may be included within a system or within a building 28. The user receiving devices 22 may be interconnected.

The user receiving device 22 may be in communication with a router 30 that forms a local area network 32 with a mobile device 34 and a wearable device 36. The router 30 may be a wireless router or a wired router or a combination of the two. For example, the user receiving device 22 may be wired to the router 30 and wirelessly coupled to the mobile device 34 and to the wearable device 36. The router 30 may communicate internet protocol (IP) signals to the user receiving device 22. The IP signals may be used for controlling various functions of the user receiving device 22. IP signals may also originate from the user receiving device 22 for communication to other devices such as the mobile device 34 or the wearable device 36 through the router 30. The mobile device 34 and the wearable device 36 may also communicate signals to the user receiving device 22 through the router 30.

The router 30 may be open, in which any device can communicate therewith, or password protected, so that a password must be provided from a device before the router can be used.

The mobile device 34 may be, but is not limited to, a mobile phone, tablet computer, laptop computer or any other type of computing device. The mobile device is not fixedly connected to wires. The wearable device 36 is one specific type of mobile device.

The wearable device 36 may be one of a number of types of wearable devices that are worn by a user. The wearable device 36 may be fixed wearable by a user meaning it is meant to be affixed to the user. Examples of wearable devices 36 include a computerized watch such as a Microsoft®, Samsung® or Apple® watch. The watch devices are fixed to an arm of the user. Another example of the wearable device 36 is GOOGLE GLASS® which is fixed to a head of a user. Of course, other types of wearable devices affixed to other parts of the body may be used. The wearable device 36 may be in direct communication with the user receiving device 22 and the mobile device 34 through a Bluetooth® connection. The wearable device 36 may also be in communication with the user receiving device 22 and the mobile device 34 through an IP connection through the router 30. The wearable device 36 may also be in communication with devices outside the local area network 32 through the router 30. That is, the wearable device 36 may communicate with other devices such as the head end 12 through the network 50. The wearable device 36 may also be in communication with the mobile device 34 which provides a bridge or a communication path to the router 30 and ultimately to the user receiving device 22 or the network 50. The wearable device 36 may generate signals such as selection signals that are communicated through the mobile device 34 but are destined to be used by the user receiving device 22, the head end 12 or other user devices in communication with the network 50.

The mobile device 34 may also be in communication with the router 30, the head end 12 and various other devices through the network 50 or other devices in other parts of the network.

The user receiving device 22 includes a screen display 38 associated therewith. The display 38 may be a television or other type of monitor. The display 38 may display both video signals and audio signals.

The mobile device 34 may also have a display 40 associated therewith. The display 40 may also display video and audio signals. The display 40 may be integrated into the mobile device 34. The display 40 may also be a touch screen that acts as at least one user interface. Other types of user interfaces on the mobile devices may include buttons and switches.

The wearable device 36 may also have a display 42 associated therewith. The display 42 may also display video and audio signals. The display 42 may be integrated into the wearable device 36. A projected display or user interface may also be projected on a surface adjacent to the eye of a user. The display 42 may also be a touch screen that acts as at least one user interface such as in a wearable watch type device. The device 36 may display function selectors or "buttons" that are other types of user interfaces on the wearable devices may include buttons and switches.

The user receiving device 22 may be in communication with the head end 12 through an external network or simply, network 50. The network 50 may be one type of network or multiple types of networks. The network 50 may, for example, be a public switched telephone network, the internet, a mobile telephone network or other type of network. The network 50 may be in communication with the user receiving device 22 through the router 30. The network 50 may also be in communication with the mobile device 34 through the router 30. Of course, the network 50 may be in direct communication with the mobile device 34 or wearable device 36 such as in a cellular system.

An in-vehicle infotainment system 44 may be incorporated into a vehicle 46. The in-vehicle infotainment system 44 may include an antenna 48 for communicating with the network 50. The in-vehicle infotainment system 44 may also be in communication with a router 30 when in range thereof. As will be described below, when the in-vehicle infotainment system 44 is within the range of a router 30 associated with the customer's account, synchronization of various data may take place. That is, the router 30 and the in-vehicle infotainment system 44 may belong to the same user. Identifiers or passwords may be exchanged to verify the in-vehicle infotainment system 44 and to allow inter-communications may take place. The antenna 48 may be used for communicating with the router 30, the network 50 and may even be used to communicate with the satellite 18. In general, the in-vehicle infotainment system 44 may be used by customers with wearable devices or mobile devices within the vehicle, and the in-vehicle infotainment system 44 may act as an interface. As will be described below, one or more displays 49 may be associated with the in-vehicle infotainment system. The display 49 may be used for displaying video signals, audio signals, or both.

The system 10 may also include a content provider 54 that provides content to the head end 12. Although only one content provider 54 is illustrated, more than one content provider may be used. The head end 12 is used for distributing the content through the satellite 18 or the network 50 to the user receiving device 22, mobile device 34, the wearable device 36, or mobile device 44. The content provided may be video and or audio content, data such as metadata that relates to the content, and a content identifier. The content data may include lyrics for use in a karaoke-type system described below. The lyrics are useful for audio content.

A data provider 56 may also provide data to the head end 12. The data provider 56 may provide various types of data such as schedule data or metadata. The metadata may ultimately be provided to a user device through the program guide system. The metadata may include various descriptions, actor, director, star ratings, titles, user ratings, television or motion picture parental guidance ratings, descriptions, related descriptions and various other types of data. The data provider 56 may provide the data directly to the head end and may also provide data to various devices such as the mobile device 34, wearable device 36, mobile device 34 and the user receiving device 22 through the network 50. This may be performed in a direct manner through the network 50.

The system 10 may also include an advertisement (ad) source 58. The advertisement source 58 provides advertisements through the network 50 to the various devices such as the user receiving device 22, the wearable device 36 and the in-vehicle infotainment system 44. The advertisement source 58 may also communicate advertisements to the head end 12, where they may be broadcasted through the satellite 18. The ad sources 58 may also be communicated from the head end 12 in a point-to-point manner through the network 50.

Figure 2:
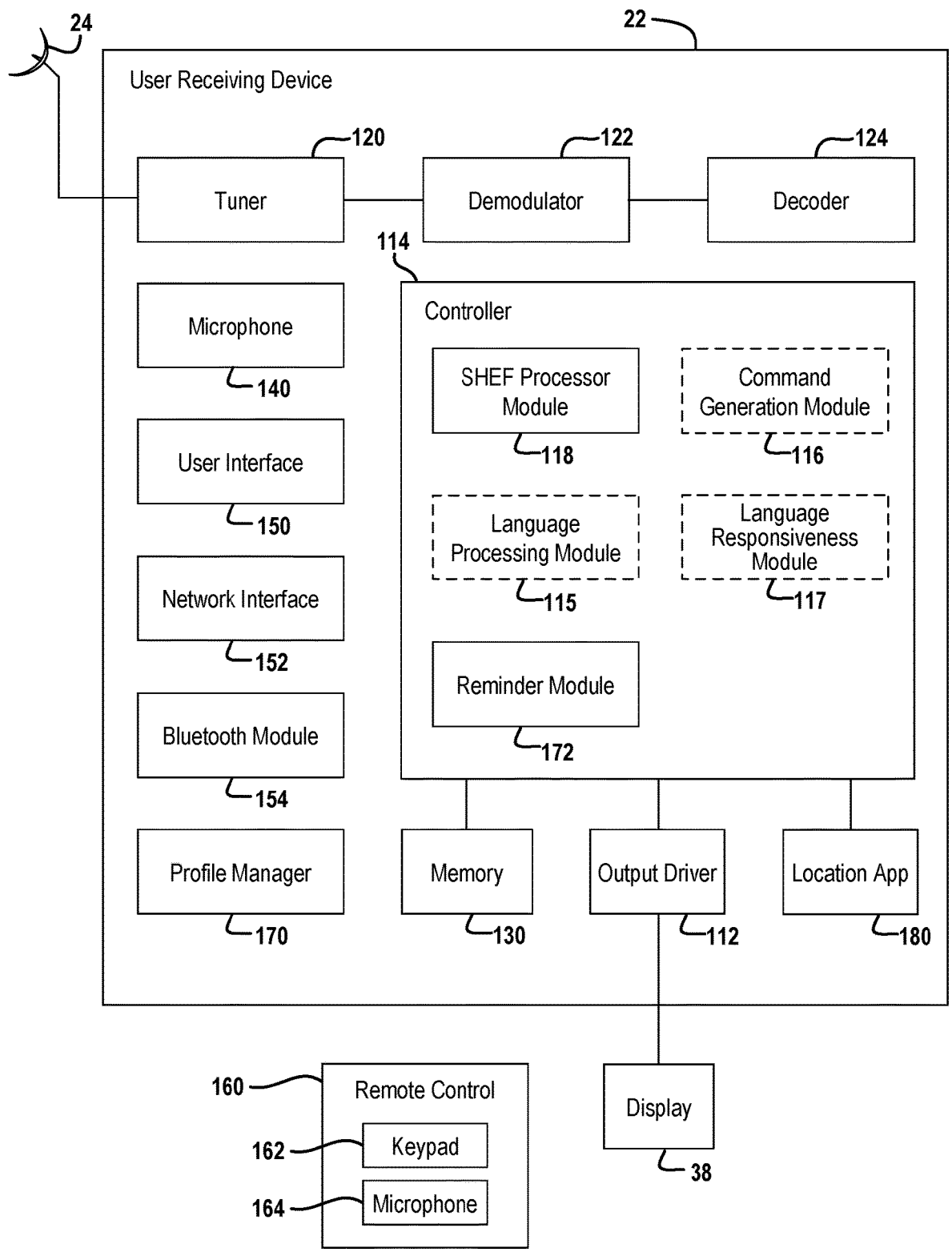
FIG. 2 is a block diagrammatic view of a user receiving device according to one example of the present disclosure.

Referring now to FIG. 2, a user receiving device 22, such as a set top box is illustrated in further detail. Although, a particular configuration of the user receiving device 22 is illustrated, it is merely representative of various electronic devices with an internal controller used as a content receiving device. Each of the components illustrated may be capable of communicating therebetween even though a physical line is not drawn.

The antenna 24 may be one of a number of different types of antennas that includes one or more low noise blocks. The antenna 24 may be a single antenna 24 used for satellite television reception. The user receiving device 22 is in communication with the display 38. The display 110 may have an output driver 112 within the user receiving device 22.

A controller 114 may be a general processor such as a microprocessor that cooperates with control software. The controller 114 may be used to coordinate and control the various functions of the user receiving device 22. These functions may include a tuner 120, a demodulator 122, a decoder 124 such as a forward error correction decoder, a buffer or other functions. The controller 114 may also be used to control various function of the user receiving device 22.

The controller 114 may also include one or more of a language processing module 115, a command generation module 116, a language responsiveness module 117 and set-top box HTTP export functionality (SHEF) processor module 118. Each of these modules is an optional feature of the user receiving device 22. As will be described below the functions associated with each of the modules 115-118 may be performed in the user receiving device or one of the other devices such as the head end or the mobile device or a combination of the three. The modules 115-118 may be located remotely from each other and may also be stand-alone devices or vendors on the network 50. In general, the language processing module 115 converts electrical signals that correspond to audible signals into a textual format or textual signal. The command generation module 116 determines a user receiving device control command that corresponds with the textual signal. The language responsiveness module 117 is used to train the system to recognize various commands.

The SHEF processor module 118 is used to receive SHEF commands and translate the SHEF commands into actual control signals within the user receiving device. Various types of SHEF commands for controlling various aspects of the user receiving device may be performed. The SHEF processor module 118 translates the hypertext transfer protocol signals received through the network into control signals within the user receiving device 22.

The tuner 120 receives the signal or data from the individual channel. The tuner 120 may receive television programming content, program guide data or other types of data. The demodulator 122 demodulates the signal or data to form a demodulated signal or data. The decoder 124 decodes the demodulated signal to form decoded data or a decoded signal. The controller 114 may be similar to that found in current DIRECTV® set top boxes which uses a chip-based multifunctional controller. Although only one tuner 120, one demodulator 122 and one decoder 124 are illustrated, multiple tuners, demodulators and decoders may be provided within a single user receiving device 22.

The controller 114 is in communication with a memory 130. The memory 130 is illustrated as a single box with multiple boxes therein. The memory 130 may actually be a plurality of different types of memory including the hard drive, a flash drive and various other types of memory. The different boxes represented in the memory 130 may be other types of memory or sections of different types of memory. The memory 130 may be non-volatile memory or volatile memory.

The memory 130 may include storage for content data and various operational data collected during operation of the user receiving device 22. The memory 130 may also include advanced program guide (APG) data. The program guide data may include various amounts of data including two or more weeks of program guide data. The program guide data may be communicated in various manners including through the satellite 18 of FIG. 1. The program guide data may include a content or program identifiers, and various data objects corresponding thereto. The program guide may include program characteristics for each program content. The program characteristic may include ratings, categories, actor, director, writer, content identifier and producer data. The data may also include various user profiles such as other settings like parental controls.

The memory 130 may also include a digital video recorder. The digital video recorder 132 may be a hard drive, flash drive, or other memory device. A record of the content stored in the digital video recorder 132 is a playlist. The playlist may be stored in the DVR 132 or a separate memory as illustrated. The playlist may be a list of content stored in the memory 130. The playlist may be general for all users or may be user specific. The memory may also store user-specific settings such as favorite channels, screen display data such as colors and font types, genres and music preferences.

The user receiving device 22 may include a voice converter such as a microphone 140 in communication with the controller 114. The microphone 140 receives audible signals and converts the audible signals into corresponding electrical signals. Typically, this is done through the use of a transducer or the like. The electrical signal corresponding to the audible may be communicated to the controller 114. The microphone 140 is an optional feature and may not be included in some examples as will be described in detail below. The electrical signal may also be process in a remotely located language processing module. Thus, the controller 114 may convert the electrical signal into a ".wav" file or other suitable file type suitable for communication through a network 50.

The user receiving device 22 may also include a user interface 150. The user interface 150 may be various types or combinations of various types of user interfaces such as but not limited to a keyboard, push buttons, a touch screen or a remote control. The user interface 150 may be used to select a channel, select various information, change the volume, change the display appearance, or other functions. The user interface 150 may be used for generating a selection signal for selecting content or data on the display 40.

A network interface 152 may be included within the user receiving device 22 to communicate various data through the network 50 illustrated above. The network interface 152 may be a WiFi, WiMax, WiMax mobile, wireless, cellular, or other types of communication systems. The network interface 152 may use various protocols for communication therethrough including, but not limited to, hypertext transfer protocol (HTTP). The network interface 152 may also be used to communicate through the router 30 of FIG. 1 to the in-vehicle infotainment system 44. Various types of data within the user receiving device 22 may be communicated through the network interface 152. For example, the network interface may obtain a playlist or content associated with a playlist. The playlist may be a list of content stored within the memory 132 of the user receiving device for later playback. The playlist may be a general playlist for all users, or may be a specific playlist for each individual user. The network interface 152 may also communicate user settings such as favorite channels, parental controls, font type and color schemes, to the in-vehicle infotainment system.

A Bluetooth® module 154 may send and receive Bluetooth® signals to or from the mobile device or wearable device. The Bluetooth® signals may be content or control signals.

A remote control device 160 may be used as a user interface for communicating control signals to the user receiving device 22. The remote control device may include a keypad 162 for generating key signals that are communicated to the user receiving device 22. The remote control device may also include a microphone 164 used for receiving an audible signal and converting the audible signal to an electrical signal. The electrical signal may be communicated to the user receiving device 22.

The user receiving device 22 may also include a profile manager 170. The profile manager 170 may use various profiles for operating and generating displays of the user receiving device. For example, the user receiving device 22 may have various users associated therewith. Each user may have user data such as a profile that is used to operate the device to provide a customized user experience. The profiles may be used to set various operations of the user receiving device 22 such as, but not limited to, a list of favorite channels, a list of operational settings of the user receiving device, a recorded program playlist, and recommendation characteristics. The recommendation characteristics may be stored while the user is associated with the user receiving device by tuning or recording various programming. User profiles may be changed in response to the user's actions at the user receiving device 22. The user settings may be established for the language, the parental controls, and other user established settings. By storing any user established settings or adjustments, a profile can easily configure the user receiving device and provide a consistent user experience without the user having to provide inputs by scrolling through various menus at each television watching experience.

The profile manager module 170 may receive the various user data or profiles that are stored within the memory 130. The user profiles may also be stored within the head end and communicated to the user receiving device. A new user may have a user profile or user data communicated from the head end or always communicated from the head end when the user is identified to the user receiving device. As will be mentioned below, the user may be identified to the user receiving device 22 through a user identifier such as a numerical code, a user name, or an identifier associated with a mobile or wearable user receiving device.

A reminder module 172 may also be included within the controller of the user receiving device 22. The reminder module 172 may be associated with a time clock or other device for generating a reminder set by a user. A reminder is a signal used for reminding a user that content is starting to be broadcasted or is about to be broadcasted. The reminder module 172 may generate a screen display on the display 38 or generate a signal communicated to the mobile device 34, the wearable device 36 or in-vehicle infotainment system 44 that corresponds to the reminder. The reminder display may provide various choices, such as record the content, or tune to the content. The recording or storing the content may take place at the device displaying the reminder or another device.

Figure 3:
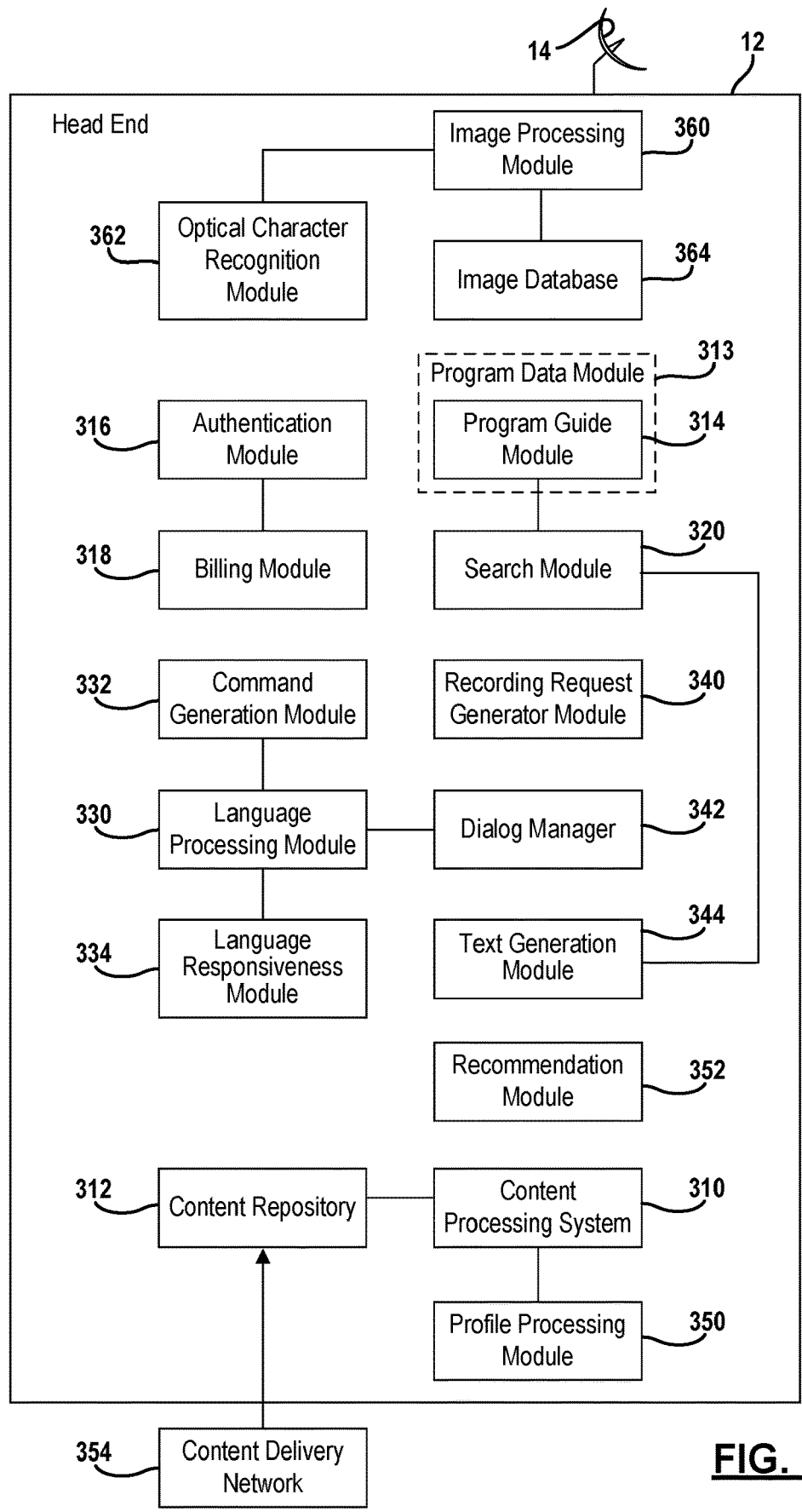
FIG. 3 is a block diagram of a head end according to one example of the present disclosure.

Referring now to FIG. 3, the head end 12 is illustrated in further detail. The head end 12 may include various modules for intercommunicating with the mobile device 34, wearable device 36, the in-vehicle infotainment system 44 and the user receiving device 22 illustrated in FIG. 1. Only a limited number of interconnections of the modules are illustrated in the head end 12 for drawing simplicity. Other interconnections may, of course, be present in a constructed example. The head end 12 receives content from the content provider 54 and advertisements from the advertisement source 58 illustrated in FIG. 1. A content processing 310 processes the content for communication through the satellite 18. The content processing system 310 may communicate live content as well as recorded content. The content processing system 310 may be coupled to a content repository 312 for storing content therein. The content repository 312 may store and process On-Demand or Pay-Per-View content for distribution at various times. The Pay-Per-View content may be broadcasted in a linear fashion (at a predetermined time according to a predetermined schedule). Linear content is presently broadcasting and may also be scheduled in the future. The content repository 312 may also store On-Demand content therein. On-Demand content is content that is broadcasted at the request of a user receiving device and may occur at any time (not on a predetermined schedule). On-Demand content is referred to as non-linear content.

The head end 12 also includes a program data module 313 that may include various types of data related to programming past, present and future. A program guide module 314 may also be included in the program data module 313. The program guide module 314 may include the programming data for present and future program data. The program data module may include data for currently unavailable content. The currently unavailable content may be made available in the future. The program guide module 314 communicates program guide data to the user receiving device 22 illustrated in FIG. 1. The program guide module 314 may create various objects that are communicated with various types of data therein. The program guide module 314 may, for example, include schedule data, various types of descriptions for the content and content identifier that uniquely identifies each content item. The program guide module 314, in a typical system, communicates up to two weeks of advanced guide data for linear content to the user receiving devices. The guide data includes tuning data such as time of broadcast, end time, channel, and transponder to name a few. Guide data may also include content available on-demand and pay-per-view content. The program data module 33 may also be a web service that communicates program guide data to the mobile device 34 into the in-vehicle infotainment system 44.

An authentication module 316 may be used to authenticate various user receiving devices, mobile devices and wearable devices that communicate with the head end 12. The authentication module 316 may be in communication with a billing module 318. The billing module 318 may provide data as to subscriptions and various authorizations suitable for the user receiving devices, the mobile devices and wearable devices that interact with the head end 12. The authentication module 316 ultimately permits the user receiving devices and mobile devices to communicate with the head end 12. Authentication may be performed by providing a user identifier, a password, a user device identifier or combinations thereof.

A search module 320 may also be included within the head end 12. The search module 320 may receive a search query comprising one or more search terms from various devices such as a mobile device or user receiving device. The search module 320 may communicate search results to at least one of the user receiving device or the mobile device. The search module 320 may interface with the program guide module 314 or the content processing system 310 or both to determine search result data. The search results may be personalized according to personal profiles, user data and viewing habits.

The head end 12 may also include a language processing module 330. The language processing module 330 may be used to generate text signals from electrical signals that correspond to audible signals received through the network 50 from a mobile device 34 or user receiving device 22 illustrated in FIG. 1. The language processing module 330 may also be or include a voice converter. The language processing module 330 may communicate the text signals to a command generation module 332. The command generation module 332 generates a user receiving device control command that corresponds to the textual signal generated by the language processing module 330. The command generation module may include various variations that correspond to a particular command. That is, people speak in various ways throughout the country and various regions. Accents and other language anomalies may be taken into consideration within the command generation module 332. Details of this will be described further below.

The head end 12 may also include a language responsiveness module 334 that is used to improve the responsiveness of the language processing module 330 and the command generation module 332. The language responsiveness module 334 is a learning mechanism used to recognize various synonyms for various commands and associate various synonyms with various commands. The details of the language responsiveness module 334 will be described in greater detail below.

The head end 12 may also include a recording request generator module 340. Various signals may be communicated from a mobile device 34, wearable device 36 or the in-vehicle infotainment system 44 illustrated in FIG. 1, or another network type computing device. A request to generate a recording may be communicated to the head end 12 and ultimately communicated to the user receiving device 22. The recording request may include a user receiving device identifier and a time to initiate recording. Other data that may be included in the recording request may include a channel, a transponder, a start time, an end time, a content delivery network identifier such as an IP address and various other types of identifiers that allow the user receiving device 22 to tune and record the desired content. The recording request generator module 340 may generate the record request in response to the reminder display.

The head end 12 may also include a dialog manager 342. The dialog manager 342 is used to generate a corrected text response such as a sentence in response to a search request. The corrected text response may be a grammatically corrected text response. The grammatically correct text response may be based on a classification that is derived from the received text of the original audible signal. The grammatically correct text response may also be provided in a voice signal that may be played back at the receiving device. An audible signal may be useful in a mobile device where text may not easily be reviewed without being distracted from other tasks like driving.

The head end 12 may also include a text generation module 344. The text generation module 344 may be used to generate text signals that are communicated through the network to the in-vehicle infotainment system 44, the mobile device 34, or the wearable device 36. The text generation module 344 may, for example, provide a textual description of a particular play in a football game or the like. The data may be communicated from the text generation module 344 as a separate signal that travels with the original signal. The textual signal may also be communicated using an HTTP command through the network 50, illustrated in FIG. 1.

The head end 12 may include a profile processing module 350. The profile processing module 350 may receive a user identifier, a device identifier or both to identify a user. The user experience of a wearable device or a set top box may be changed based upon the characteristics of a user. The profile processing module 350 may provide user characteristics to a set top box or other user receiving device 22 through the network. The profile processing module 350 may store various types of data, including a favorite channel list, a playlist and parental settings. The profile processing module 350 may also store identifiers corresponding to content watched so that recommendations may be provided to the user. As content is watched, the content identifier and the user identifier may be communicated to the head end and stored therein. Recommendations may thus be generated for a particular user that corresponds to content of interest to the user. The head end 12 may thus store profile data or user data for all of the system users so that it may be distributed to various devices when necessary.

The recommendations may be generated in a recommendation module 352 by comparing metadata associated with watched content or user profile to upcoming broadcasted content or available on-demand content. The recommendations for a user may be communicated as a reminder signal and a reminder screen display.

The search module 320, the language processing module 330, the command generation module 332, the language responsiveness module 334, the dialog manager 342, the text generation module 344 and the profile processing module 350 are illustrated by way of example for convenience within the head end 12. As those skilled in the art will recognize, these modules 320-352 may also be located in various other locations together or remote to/from each other including outside the head end 12. The network 50 may be used to communicate with modules 320-352 located outside the head end 12.

A content delivery network 354 may be in communication with a content repository 312. The content delivery network 354 is illustrated outside of the head end 12. However, the content delivery network 354 may also be included within the head end 12. The content delivery network 354 may be managed or operated by operators other than the operators of the head end 12. The content delivery network 354 may be responsible for communicating content to the various devices outside of the head end 12. Although only one content delivery network 354 is illustrated, multiple content delivery networks may be used.

The program data module 313 may be in communication with an image processing module 360. The image processing module 360 may process image data received from a visual source as is described below. The visual source may be located externally to the head end 12 such as at a mobile user device, wearable device or within a vehicle connected to the in-vehicle infotainment system. The image processing module 360 is processed to determine unique signatures, predefined patterns or characteristics of an image. The image processing module 360 may be in communication with an optical character recognition module 362. The optical character recognition module 362 may be used to recognize users associated within a vehicle using the in-vehicle infotainment system so that user profiles may be used to personalize content, settings or profiles. Of course the head end is only one such place to perform user determination.

The image processing module 360 may also be in communication with an image database 364. The image database 364 may include various images associated with user identifiers. For example, the image database 364 may include facial or body images of various users so recognition may take place.

Figure 4A:
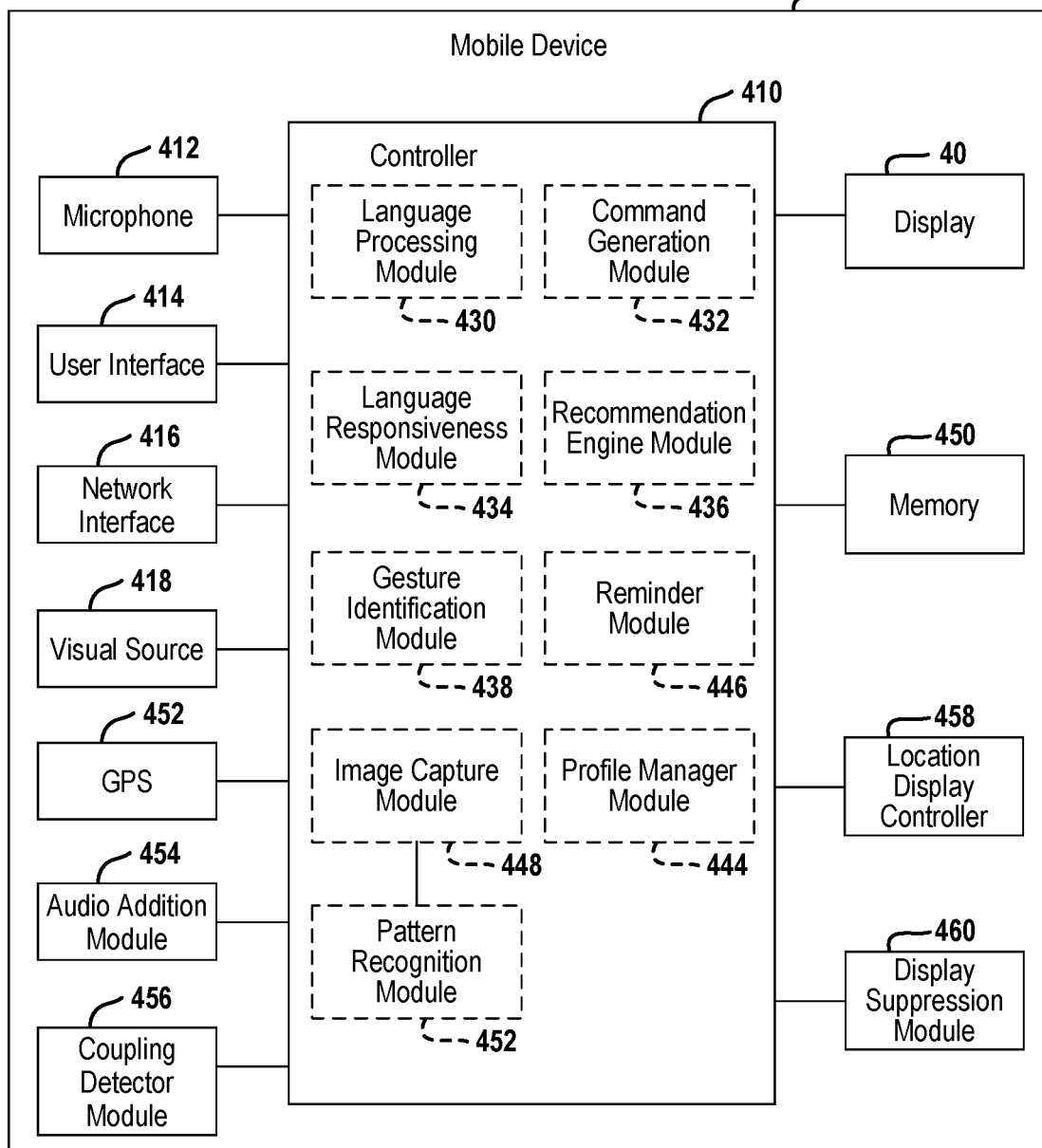
FIG. 4A is a block diagram of a mobile device according to one example of the present disclosure.

Referring now to FIG. 4A, the mobile device 34 is illustrated in further detail. The mobile device 34 includes a controller 410 that includes various modules that control the various functions.

The controller 410 is in communication with a microphone 412 that receives audible signals and converts the audible signals into electrical signals. The audible signals may include a request signal. The request signal may be to perform a search, obtain guide data network data or playlist data (or content associated with a playlist). The playlist content may correspond to a playlist associated with a user profile The controller 410 is also in communication with a user interface 414. The user interface 414 may be buttons, input switches or a touch screen.

A network interface 416 is also in communication with the controller 410. The network interface 416 may be used to interface with the network 50. As mentioned above, the network 50 may be a wireless network or the internet. The network interface 416 may communicate with a cellular system or with the internet or both. A network identifier may be attached to or associated with each communication from the mobile device so that a determination may be made by another device as to whether the mobile device and the user receiving device are in the same local area network.

The mobile device 34 may also include a visual source 418. The visual source 418 may be a camera or charge coupled device. The visual source 418 captures an image signal. The image signal may be a digital image signal or an analog image signal used for user recognition. Recognition may take place within the mobile device, the user receiving device, the wearable device or the head end.

The mobile device 34 may also include a GPS receiver 420. The GPS receiver 420 may be used to determine a position of the mobile device as a coordinate on the Earth's surface. The GPS receiver 420 may generate a location signal.

The controller 410 may also be in communication with the display 40 described above in FIG. 1. The controller 410 may generate graphical user interfaces and content descriptions.

The controller 410 may also include a language processing module 430, a command generation module 432 and a language processing module 434. Modules 430, 432 and 434 are optional components. That is, command generation and language responsiveness may be performed in remote locations such as external to the mobile device. Each of the head end 12, the user receiving device 22 or the mobile device 34, and the in-vehicle infotainment system 44 may optionally include one or more language processing modules, command generation modules or language responsiveness modules. Also, as mentioned above, none of the devices may include the modules. Rather, the modules may be interconnected with the network 50 without residing in the head end, the user receiving device or the mobile device. Variations of this will be provided in the example set forth below.

A recommendation engine 436 may also be included within the controller 410. The recommendation engine 436 may have various data that is stored in a memory 450 of the mobile device 34. For example, selected content, content for which further data was sought, and recorded content may all be stored within the memory 450. The recommendation engine 436 may provide recommendations obtained whose content data or metadata has been obtained from the head end 12. The recommendations may be tailored to the interests of the user of the mobile device. The recommendation engine 436 may communicate the data such as the selected content, the content for which data was sought, the recorded content and the like to the head end and, in particular, the profile processing module 350.

The controller 410 may also include a gesture identification module 438 that identifies gestures performed on the display 38. For example, the gestures may be a move of dragging the user's finger up, down, sideways or holding in a location for a predetermined amount of time. A gesture performed at a certain screen may be translated into a particular command.

A profile manager 444 may store user profile data within the mobile device. The profile manager 444 may store user settings, such as favorites and parental controls. The profile manager 444 may also save relative to the recommendation engine 436 for each individual user of the mobile device. The profile manager 444 may also receive profile data from the profile processing module 350 of the head end 12 through the network.

A reminder module 446 may also be included within the controller 410 of the mobile device 34. The reminder module 446 may be associated with a time clock or other device for generating a reminder set by a user. The reminder module 446 may generate a screen display on the display 38 that corresponds to a reminder and provides various choices, such as record or tune, to the user. The reminder may be generated based on a recommendation or recommendation list or set by a user for a specific content.

The controller 410 may also include an image capture module 448. The image capture module 448 may receive the electrical image signal from the visual source 418 and ultimately store the image in the memory 450. The image capture module 448 may be in communication with a pattern recognition module 452. The pattern recognition module 452 may perform many of the functions of the image processing module 360. The pattern recognition module 452 recognizes patterns or signatures from the image. The pattern recognition module 452 may, however, not ultimately process and recognize images. Rather, the pattern recognition module 452 may recognize patterns and unique signatures which are ultimately communicated to the head end 12 for processing by the image processing module 360 illustrated in FIG. 3. Pattern recognition may be based on mathematical algorithms based on signal positives and relative pixel positions within the image. The pattern recognition module 452 may not process or compare to image data because the amount of image data may be excessively large and thus processing at the head end 12 may be more practical.

The mobile device 34 may also include an audio addition module 454. The audio addition module 454 may be used for receiving an audio signal and adding a secondary audio signal thereto. Details of the audio addition module will be set forth in FIG. 4B.

A coupling detector module 456 may also be included within the mobile device 34. The coupling detector module 456 is used to detect the coupling of the mobile device 34 with the in-vehicle infotainment system 44. The coupling detector module 456 allows in-vehicle control of the mobile devices 34 through the in-vehicle infotainment system 44. Details of this will be set forth below. The coupling detector module 456 detects when a mobile device 34 is coupled to an in-vehicle network.

The mobile device 34 may also comprise a location display controller 458. The location display controller 458 may control the display 40 of the mobile device 34 to display a saved location. The location display controller 458 may allow the mobile device 34 to for example, detect a last location of the vehicle when the mobile device 34 is decoupled from the in-vehicle network.

A display suppression module 460 may also be incorporated into the mobile device 34. The display suppression module 460 may be used to suppress the display of the mobile device when the mobile device 34 is within the in-vehicle network. That is, when a connection with the in-vehicle infotainment system is made, a blocking signal generated at the display suppression module prevents or suppresses a notification signal such as a reminder or suggestion from being displayed. Suppressing the display may include suppressing a notification at mobile device and thereafter communicating the notification to the in-vehicle infotainment system so that the notification is displayed on a display associated therewith.

Figure 4B:
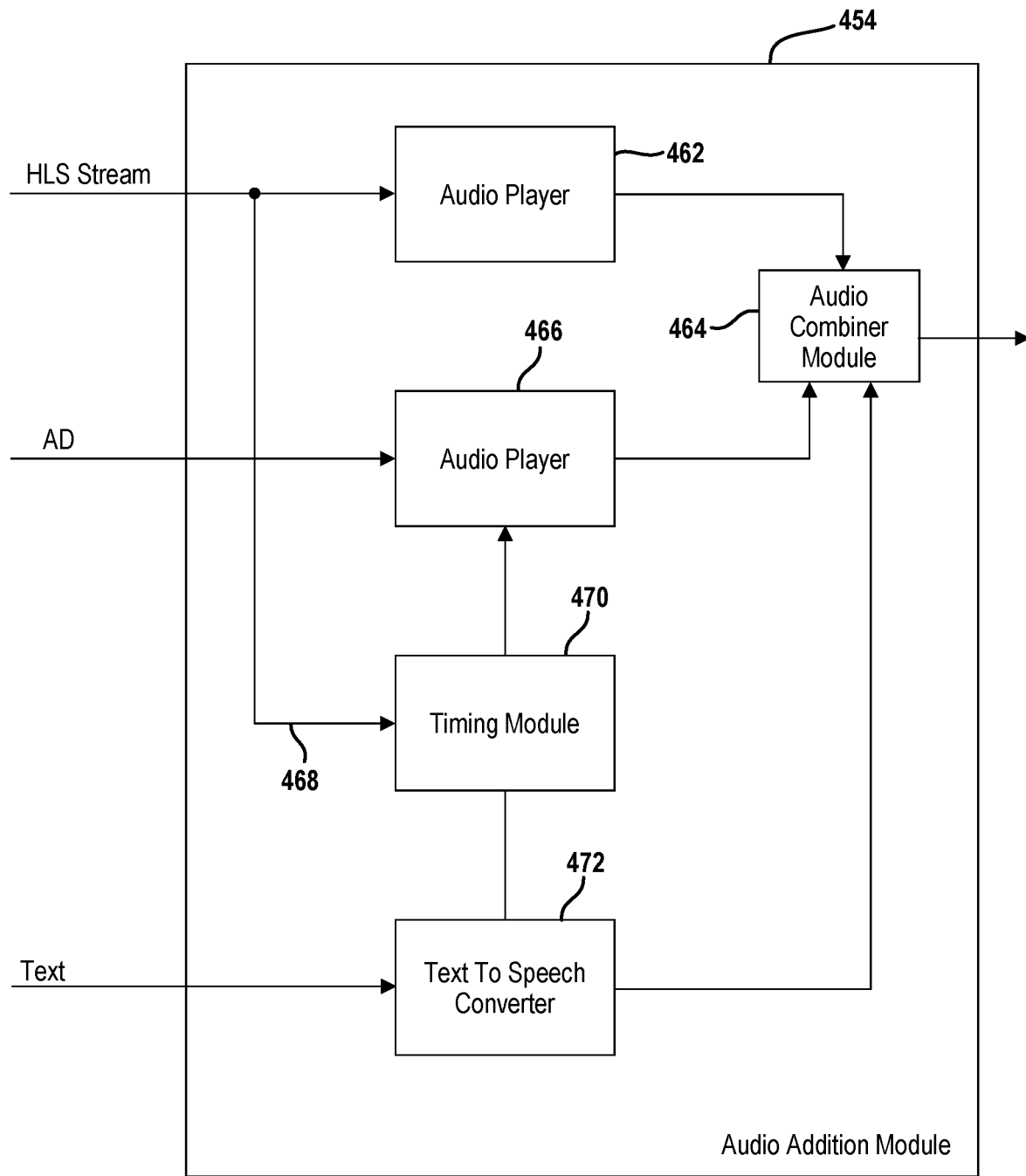
FIG. 4B is a block diagram of the audio addition module of FIG. 4A.

Referring now to FIG. 4B, the audio addition module 454 is illustrated in further detail. The audio addition module 454 may include an audio player 462. The audio player 462 is used to extract audio from a television signal. The television signal may be referred to as an HTTP live streaming signal (HLS). The audio signal from the audio player 462 may be communicated to an audio combiner module 464.

The audio addition module 454 may also include a second audio player 466. The second audio player 466 may receive a signal, such as an advertisement audio signal, by way of the network 50. The second audio player 466 receives the audio signal and communicates the audio signal to the audio combiner module 464.

The HLS stream may include a trigger signal 468. The trigger signal may be communicated to a timing module 470. The timing module 470 may trigger the audio player 466 to play back the second audio stream, such as the ad or sports play description, and communicate the ad to the audio combiner module 464. The audio player 466 may buffer the signal in an internal memory within the audio player, or a separate memory within the mobile device.

A text-to-speech converter 472 may be used to receive a text signal generated by the head end, another component of the system. As mentioned above, the head end may generate a text signal that corresponds to the details of a particular play, or even an advertisement. The text-to-speech converter 472 converts text data to an audible signal which is communicated from the text-to-speech converter 472 to the audio combiner module 464. Ultimately, the audio combiner module 464 communicates content through the mobile device 34 to the in-vehicle infotainment system 44 illustrated in FIG. 1. Details of the operation of the audio addition module will be described below.

Figure 5:
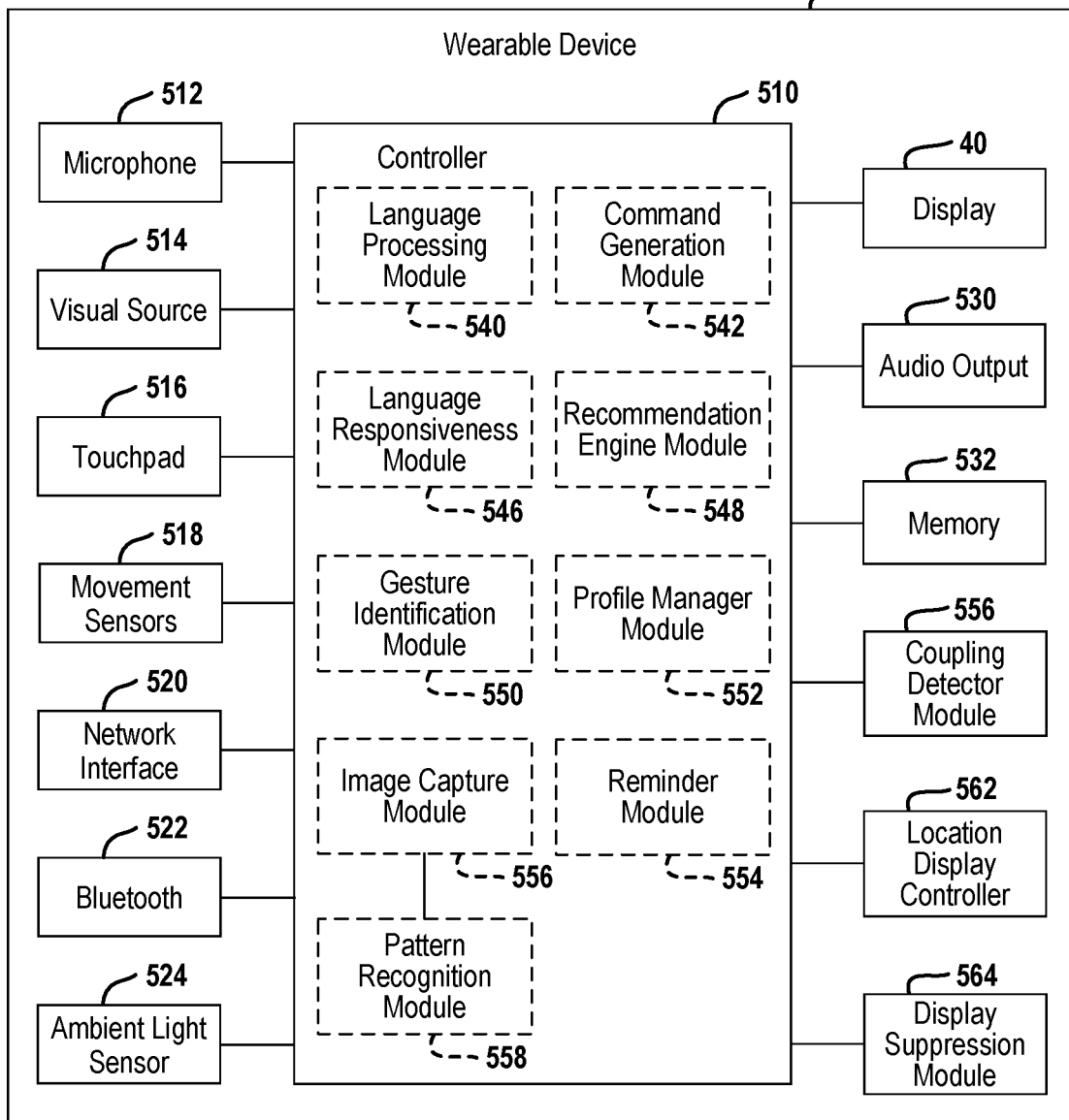
FIG. 5 is a block diagram of a wearable device according to one example of the present disclosure.

Referring now to FIG. 5, a block diagrammatic view of wearable device 36 is set forth. As mentioned above, the wearable device 36 may be one of a number of types of wearable devices including a computerized watch or wrist worn device, a head worn device such as GOOGLE GLASS® or another type of computerized device suitable to be worn or affixed to the user. The wearable device 36 may include a microphone 512 that receives audible signals and converts the audible signals into electrical signals. A visual source 514 such as a camera generates digital image signals. A touchpad 516 provides digital signals corresponding to the touch of a hand or finger. The touchpad 516 may sense the movement of a finger or other user input. The wearable device 36 may also include a movement sensor 518 that provides signals corresponding to movement of the device. Physical movement of the device may also correspond to an input. The movement sensors 518 may include accelerometers and moment sensors that generate signals that allow the device to determine the relative movement and orientation of the device.

The wearable device 36 may also include a network interface 520. The network interface 520 provides input and output signals to a wireless network, such as the internet. The network interface may also communicate with a cellular system.

A Bluetooth® module 522 may send and receive Bluetooth® formatted signals to and from the controller 510 and communicated them externally to the wearable device 36.

An ambient light sensor 524 generates a signal corresponding to the ambient light levels around the wearable device 36. The ambient light sensor 524 generates a digital signal that corresponds to the amount of ambient light around the wearable device 36.

The controller 510 may also be in communication with the display 40 an audio output 530 and a memory 532. The audio output 530 may generate an audible signal through a speaker or other device. Beeps and buzzers to provide the user with feedback may be generated. The memory 532 may be used to store various types of information including a user identifier, a user profile, a user location and user preferences. Of course, other operating parameters may also be stored within the memory 532.

The controller 510 may include various modules that correspond to the modules set forth in the mobile device in FIG. 4. The language processing module 540, the command generation module 542, the language responsiveness module 546, the recommendation engine module 548, the gesture identification module 550, the profile manager module 552, the reminder module 554, the display suppression module 560, the location display controller 562, and the coupling detector module 564, correspond to the functions of the language processing module 430, the command generation module 432, the language responsiveness module 534, the recommendation engine module 436, the gesture identification module 438, the profile manager module 444, the reminder module 446, the display suppression module 460, the location display controller 458, and the coupling detector module 456, respectively, and of FIG. 4. The functions of these elements will not be repeated again.

The wearable device 36 may also include an image capture module 556 and a pattern recognition module 558. The image capture module 556 may be in communication with the visual source 514 in a similar manner to that described above relative to the corresponding modules of the mobile device 34 in FIG. 4. Further, the pattern recognition module 558 may also act in a similar manner to that set forth above with respect to the pattern recognition module 452. However, the pattern recognition module 558 may be an optional component of the controller 510. That is, the controller 510 of the wearable device 36 may not include the pattern recognition module 558. It is envisioned that some wearable devices 36 may not include a significant amount of computing power. The wearable device 36 may rely on an associated mobile device 34 for processing the image signal. The pattern recognition module 452 of the mobile device 34 illustrated in FIG. 4 may perform the pattern recognition module. The image capture module 556 may communicate a digital signal through a network or a network interface 520 or Bluetooth® module 522 to allow the mobile device 34 to receive the signal therein. The mobile device 34 of FIG. 4, once recognizing the image data and performing pattern recognition in the pattern recognition module 452, may communicate the recognized pattern to the head end as described above relative to FIG. 4.

Figure 6:
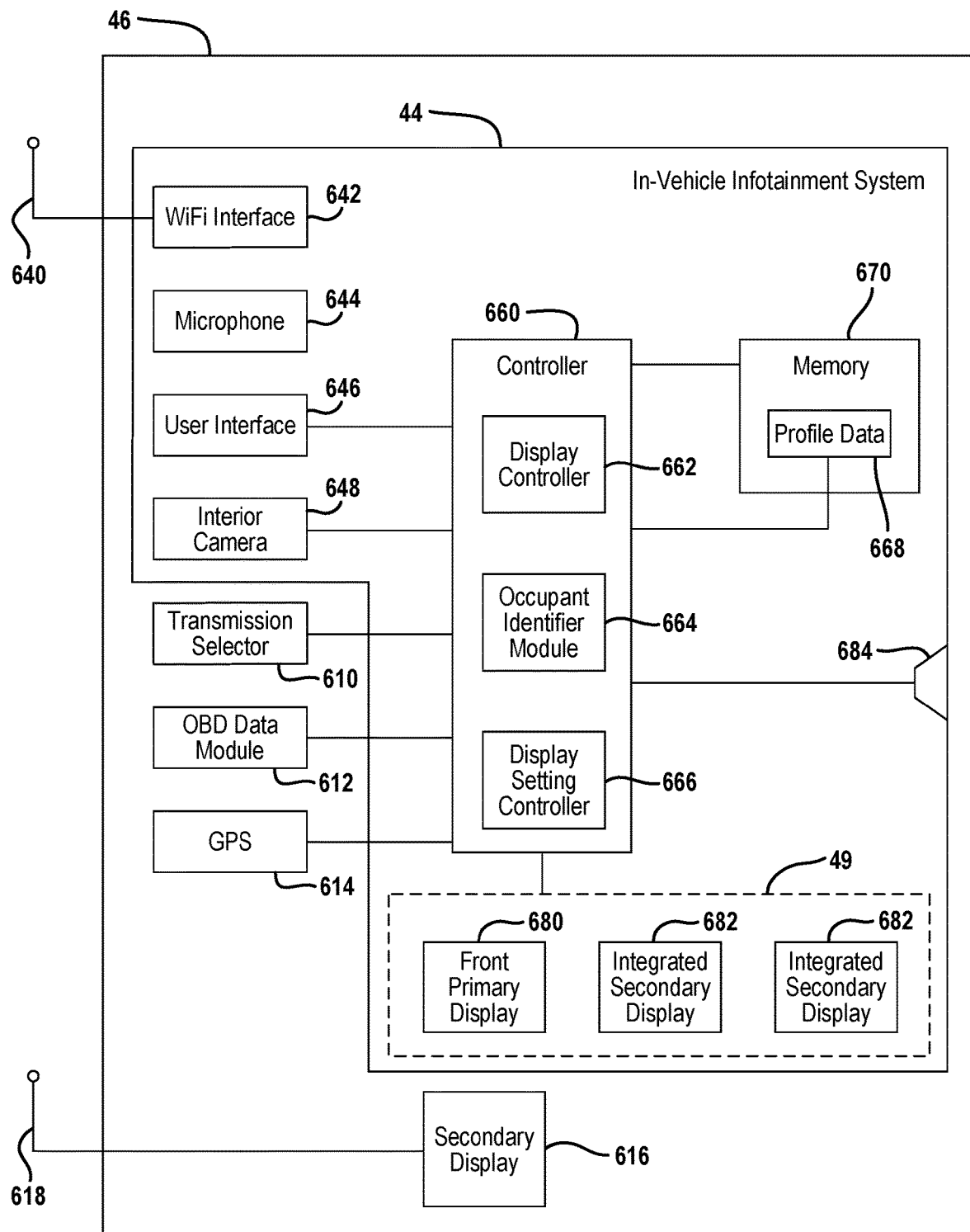
FIG. 6 is a high level block diagrammatic view of an in-vehicle infotainment system.

Referring now to FIG. 6, the in-vehicle infotainment system 44 is illustrated in block diagrammatic form. The infotainment system 44 is contained within the vehicle 46 as described above. The vehicle 46 may include various components that interact with the in-vehicle infotainment system 44. For example, the vehicle 46 may include a transmission selector 610 that is used to select a gear of the transmission. The transmission selector 610 may provide electronic feedback as to the position of a transmission selector. Transmission selectors may take many forms, including a stick shift, a PRNDL stick selector, or a push button selector. The transmission selector 610 may generate a transmission selector signal that is communicated to the in-vehicle infotainment system.

An on-board vehicle diagnostic data module 612 is a system that may also communicate with the in-vehicle infotainment system. The OBD data module 612 may obtain various types of data from the vehicle including speed data, engine sensor data, distance or trip data, and the like.

The vehicle 46 may also include a global position system 614. The global position system 614 provides coordinate location data to the in-vehicle infotainment system 44. It should be noted that the global positioning system 614 may also be included within the in-vehicle infotainment system. A secondary display 616 may also be included within the vehicle 46. The secondary display 616 may be used for displaying various types of data. The secondary display 616 may be a standalone device, such as the mobile device 34 or wearable device 36 described above. The secondary display 616 may include an antenna 618 that communicates through a local area network or in an in-vehicle network.

The in-vehicle infotainment system 44 may also include an antenna 640 that is in electrical communication with a Wi-Fi interface 642. The antenna 640 may be used to communicate with an external Wi-Fi network such as a home Wi-Fi network. The antenna 640 may also be used to form a Wi-Fi network with devices within the vehicle and thus may form an in-vehicle network.

The in-vehicle infotainment system 44 may also include a microphone 644 that is used for providing an audio input to the in-vehicle infotainment system 44. The microphone 644 may be used for requesting various commands or making VOW calls from the in-vehicle infotainment system 44 as described below. The microphone 644 may act as a user interface for receiving voice commands.

A user interface 646 may also be incorporated into the in-vehicle infotainment system 44 may include a touch screen, keyboard or buttons. Of course, other types of user interfaces may be incorporated into the in-vehicle infotainment system, such as the microphone 644 described above.

An interior camera 648 may also be incorporated into the in-vehicle infotainment system. The interior camera 648 may be used for occupant identification. The interior camera 648 may detect one or more occupants so that vehicle profiles and the like may be customized. The interior camera 648 generates an image signal. One or more interior cameras 648 may be used for occupant detection.

The in-vehicle infotainment system 44 includes a controller 660 that is used for controlling the various functions. The controller 660 may include a display controller module 662 that is used to control the various displays associated with the infotainment system.

An occupant identifier module 664 may also be included with the in-vehicle infotainment system 44. The interior camera 648 may provide an input to the occupant identifier module 664. The occupant identifier module 664 may adjust the profiles and detect the occupants. The interior camera 648 may also have its signal communicated through a network to another device such as the user receiving device 22 described above in FIG. 1.

A display setting controller 666 may be in communication with the occupant identifier module 664. The display setting controller 666 may determine the settings from profile data 668 contained within a memory 670. The profile data 668 may include playlists, content, display settings, favorites and the like. The display setting controller may set the display to different settings based upon different occupants. The memory 670 may also store other data including actual content, and other operational settings of the in-vehicle infotainment system 44.

A primary display 680, and a secondary display 682 are illustrated as being incorporated in the in-vehicle infotainment system. The displays may be wired or wirelessly connected to the controller 660. The primary display 680 may be a display that is located in the front of the vehicle in the instrument panel. The secondary displays 682 may be incorporated in a seatback or drop down screen display located within the vehicle 46. The primary display 680 may be referred to as a master or primary display, in that various controls may be initiated or operated that the secondary displays 682 cannot perform. The primary display 680 may also be disabled or partially disabled once the vehicle is underway. For example, videos may be prevented from being displayed. Determining the vehicle is underway may take place using speed data from the OBD data module 612 or the transmission selector signal from the transmission selector 610. Of course, a combination of the transmission selector signal and OBD data may be used to determine the vehicle is underway and generate a disable signal at the controller. It should be noted that all three displays 680 and the two secondary displays 682 may each be operated independently. The displays 680, 682 may have headphone jacks or speakers associated therewith. A speaker 684 representing one or more speakers may be included in the in-vehicle infotainment system 44. The speakers 684 may be dedicated to the in-vehicle infotainment system 44 or may be shared with the rest of the vehicle.

The controller 660 may perform various functions, including those illustrated in the modules 662 through 666. The description of the various functions performed by the controller 660 and the interaction of the in-vehicle infotainment system 44 with the other devices within the in-vehicle network 686 are set forth in further detail below.

Figure 7:
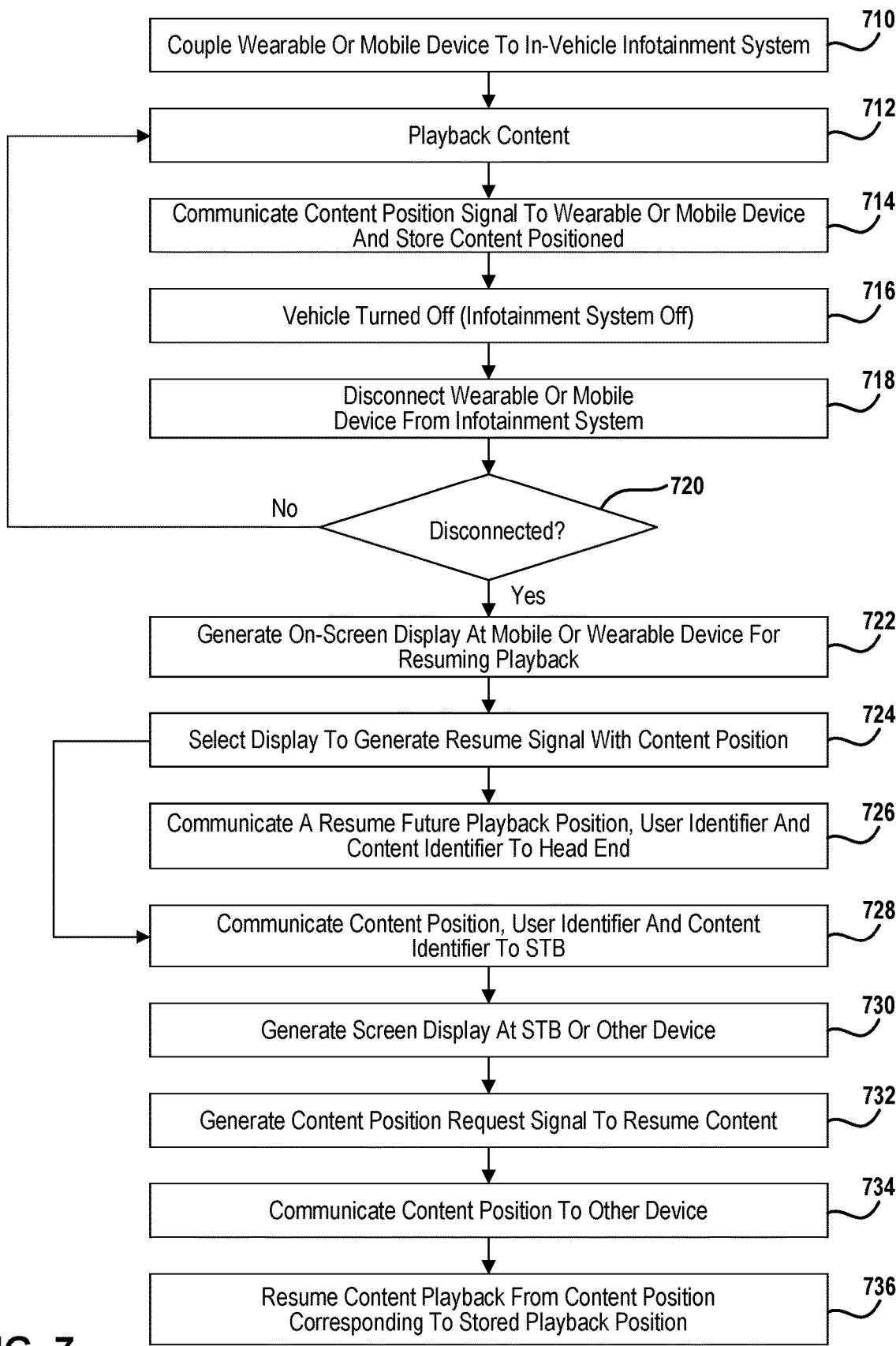
FIG. 7 is a flowchart of a method for resuming playback of content played through the vehicle.

Referring now to FIG. 7, a method for resuming content being played back within a vehicle is set forth. The method applies equally to wearable devices or mobile devices. In step 710, a wearable or mobile device is coupled to an in-vehicle infotainment system. This may be performed through the network 686 shown in FIG. 6, or through a direct connection such as a Bluetooth® connection. In step 712, content is played back through the in-vehicle infotainment system in a system without dedicated displays, the displays of the wearable or mobile devices may be used for playing back content. In step 714, the content position is communicated to the wearable or mobile device. This may be performed periodically, continually, or upon trigger from in-vehicle data, such as placing the vehicle in park. The content position may correspond to the last playback position of the content. Because of the updates being performed updated playback positions are stored. It may be the exact position or a relatively close position to the last played position. In-vehicle data may come from the onboard diagnostic data module 612 illustrated in FIG. 6, or the transmission selector 610 of FIG. 6.

In step 718, the wearable or mobile device is disconnected from the infotainment system. Disconnecting the wearable or mobile device from the infotainment system may take place when the ignition is off, or the mobile or wearable device is out of range for Bluetooth or the WiFi antenna. When the wearable device is not disconnected in step 720, content continues to playback in steps 712 through 718.

In step 720, when the mobile or wearable device is disconnected, step 722 generates an on-screen display for the mobile or wearable device for resuming content playback in the future. The screen by way of example may be referred to a resuming future playback screen which is described in FIG. 8A. In step 724, the display is selected to generate a resume signal with a content position. In step 724, the content position corresponding to a last playback position was stored within the wearable or mobile device. In step 726, the content position may be communicated to the head end. That is, a resume future playback position, a user identifier, and a content identifier may be communicated to the head end for storage therein. In this manner, the content may be played back from any device based on the stored content position. This step is an optional step.

After step 724, step 728 may be performed. In step 728, the content position may be communicated to the set top box. This may be performed instead of to the head end as described above in step 726. The content position may be communicated with a user identifier and a content identifier. In step 730, a screen display is generated at the set top box for resuming content. In step 732, a selection or content position request signal may be generated in association with the set top box, or another user device associated with the account. In step 732, the selection signal for resuming content form the content position is generated. In step 736, content may be resumed from a position corresponding to the stored playback position.

In step 734 the content position signal may be communicated to the requesting device. The requesting device that generates the content position request signal may be the set top box or another mobile or wearable device.

Figure 8A:
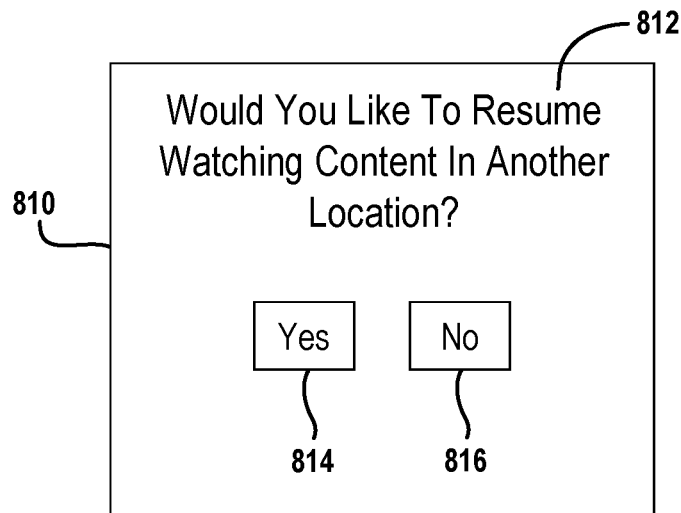
FIG. 8A is a screen display for resuming content.

Referring now to FIG. 8A, a screen display 810 is illustrated for resuming playback of content in the future. A message 812 on the resuming future playback screen is generated for querying whether the content is desired to be resumed in another location. Button 814 may be a screen display button, or may be activated by another type of user interface at the mobile or wearable device. Button 814 corresponds to an affirmative or "yes" position, and button 816 corresponds to a "no" position. The screen display 810 may be generated at step 722 of FIG. 7. In response to the "yes" selection, a content position signal may be communicated to the head end or set top box.

Figure 8B:
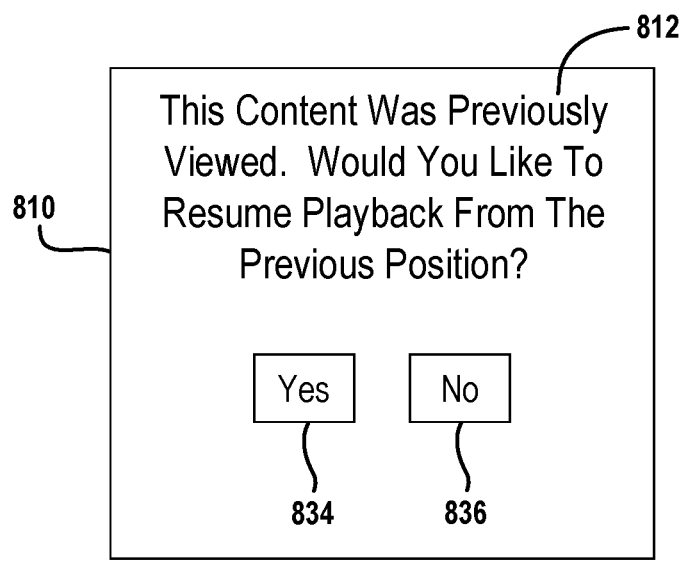
FIG. 8B is a screen display for resuming the playback of content.

Referring now to FIG. 8B, a screen display 830 is displayed for resuming content. A message 832 corresponding to resuming playback may be displayed to the user at another device, such as the set top box, a mobile or wearable device. Message 832 may read, for example, "this content was previously viewed. Would you like to resume playback from the previous position?" Selector buttons 834 and 836 may be displayed. Selector button 834 corresponds to an affirmative or "yes" decision for resuming content playback. A content position may be communicated to the requesting device when the selector button 834 is selected. By selecting selector button 836, the content will not be resumed at a previous position.

Figure 9:
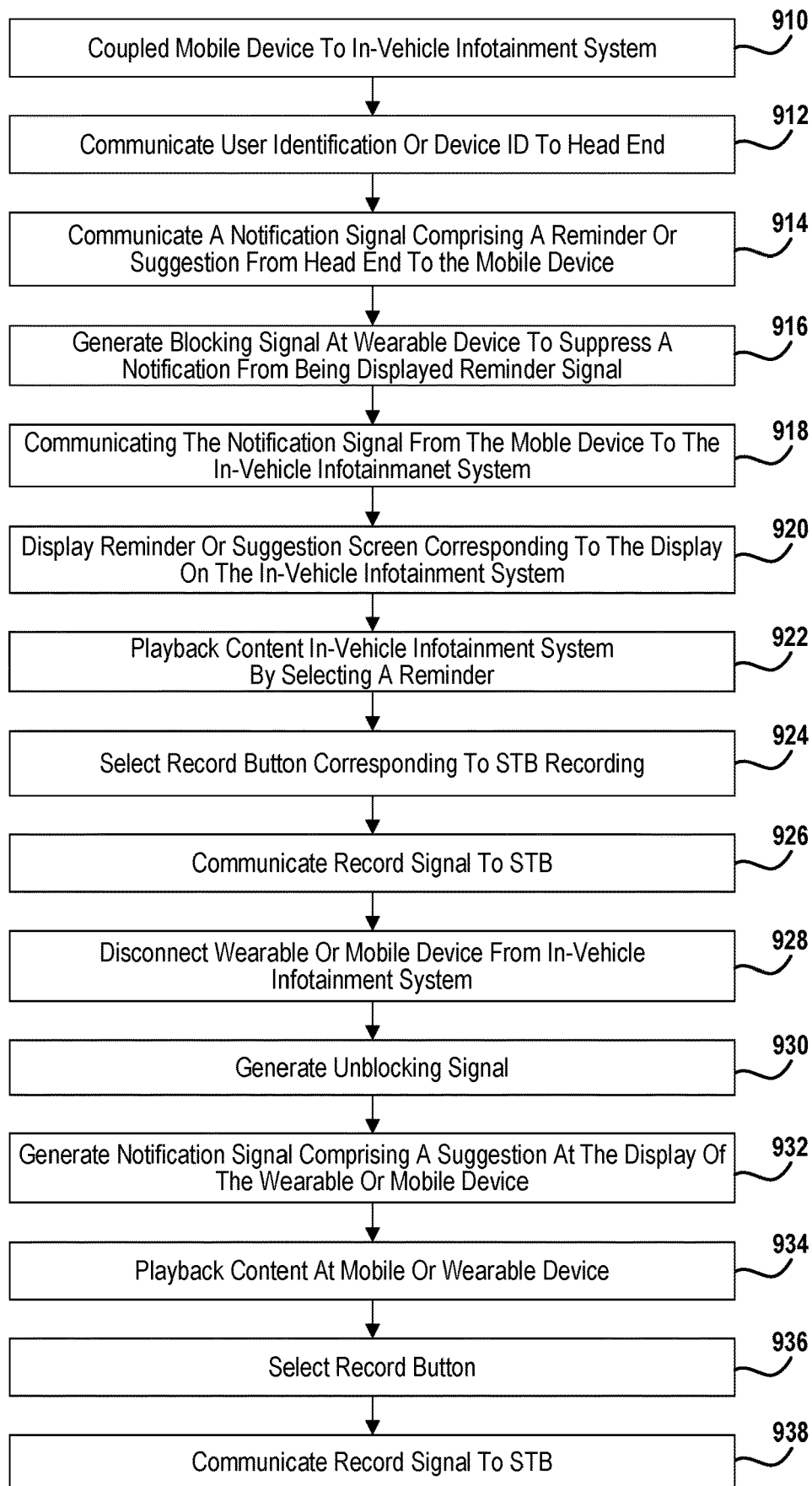
FIG. 9 is a flowchart of a method for recording a suggestion or reminder.

Referring now to FIG. 9, a method for recording content at the set top box when content is played back from an in-vehicle infotainment system is set forth. In step 910, a mobile device is coupled to an in-vehicle infotainment system. As mentioned above, this may take place using Bluetooth® or bringing the mobile or wearable device into the in-vehicle network. This may be performed by communicating a user identifier or a user device identifier to the in-vehicle infotainment system. A password may also be used. In step 912, the user identifier or device identifier is communicated to the head end. In step 914, a notification signal comprising a reminder signal or suggestion signal is communicated from the head end to the mobile device. The reminder signal may be generated in response to an established reminder set up by the user for generating a reminder when a particular content is about to be broadcasted. The reminder signal may be generated at various devices including the set top box, the wearable device, the mobile device or the in-vehicle infotainment system. When the predetermined time is reached, the reminder signal may be communicated to the user at the mobile device currently being operated. A suggestion signal from step 914 may also be generated. The suggestion signal may correspond to a recommendation or recommendation list based upon various parameters, including previously viewed content.

In step 916, a blocking signal may be generated at the wearable device or to suppress the reminder signal or suggestion signal from being displayed at the wearable or mobile device. The blocking signal may be generated in response to the mobile or wearable device being coupled to the in-vehicle infotainment system through the in-vehicle network or through a direct connection, such as a Bluetooth® connection. In step 918, the notification signal is communicated from the mobile device to the in-vehicle infotainment system. In step 920 a reminder signal, recommendation signal or suggestion signal is generated at a screen display in the in-vehicle infotainment system. In this document, recommendation and suggestion are equivalent. In this manner, steps 916-920 cooperate so that the in-vehicle infotainment system generates the screen display, rather than the wearable or mobile device. This will reduce operator distraction if the wearable or mobile device is for the driver of the vehicle. In step 922, playback of the content may be performed when selecting a "tune" button on a screen display displaying the reminder signal. A tune selector signal is generated by selecting the tune button. The tune selector signal may comprise a content identifier. The head end content delivery network may then stream content to the in-vehicle infotainment system. Streaming may take place directly to the in-vehicle infotainment system or indirectly through a mobile device. The screen display, or a screen display, of the in-vehicle infotainment system may then display the content being streamed from the head end or another content delivery network. In step 924, when the record selector button is selected at a user interface, step 926 communicates a recording selector signal to the set top box. One of the steps 922 and 924 may be performed. Of course, the notification signal may also be ignored and no action takes place. The recording selector signal may be communicated to the set top box directly through the network, or a record request signal may be communicated from the infotainment system, the wearable device, or the user device to the head end through the network. A conditional access packet signal may be generated at the head end and communicated to the set top box to initiate recording. The record signal may be communicated to the set top box from the head end through the satellite. Content data such as the time, channel, and content identifier may be communicated to the set top box.

The wearable device may then be disconnected from the infotainment system. Various reasons for disconnecting the wearable device or mobile device from the infotainment system may be provided, such as at the end of a trip or a passenger leaving the vehicle. After step 928, step 930 generates an unblocking signal. The unblocking signal is generated at the mobile or user device so that the system notifications may be generated at the mobile or wearable device. In step 932, a reminder or suggestion signal screen display may then be generated at the wearable or mobile device. After step 932, steps 934 through 938 may be performed. Steps 934 through 938 correspond to steps 922 through 928, except that the mobile or wearable device screen display is used for displaying the content or initiating recording of the content. That is, in step 934, playing back the content may be selected from the screen display generated in step 936. If a recording button is selected in step 928, a record signal is communicated to the set top box in step 938. Step 938 may be performed and may perform in a similar manner to step 926, in that the record signal may be communicated directly to the set top box or may be communicated to the head end, wherein the head end generates a conditional access signal for recording the reminded or suggested content.

Figure 10A:
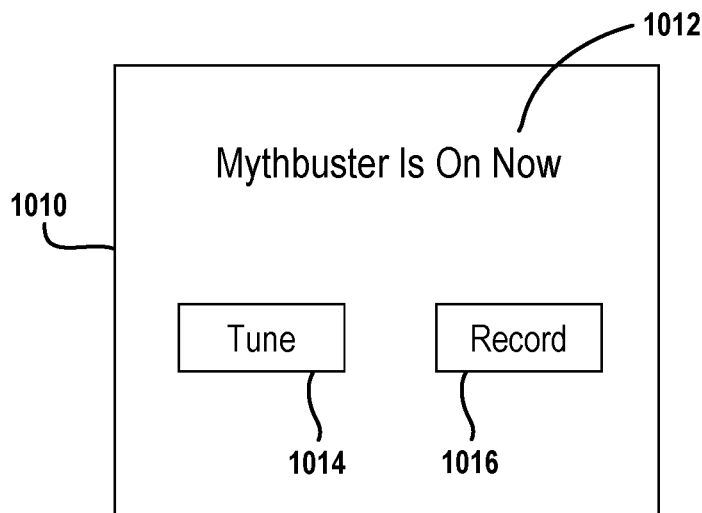
FIG. 10A is a screen display illustrating a reminder displaying tuning and recording buttons.

Referring now to FIG. 10A, a screen display 1010 generated at the in-vehicle infotainment system in step 920, or at the wearable or mobile device in step 932, is set forth. In this example, the screen display 1010 is generating a message 1012 corresponding to a particular content that is suggested or is being reminded. A tune selector button 1014 corresponds to tuning to the content at the wearable, mobile, or in-vehicle system. In the present example, "tune" is displayed within the tune selector button 1014. A record button 1016 may also be displayed in the screen display 1010. The record button 1016 generates the record signal and communicates the record signal ultimately to the set top box as is indicated in steps 924 and 938.

Figure 10B:
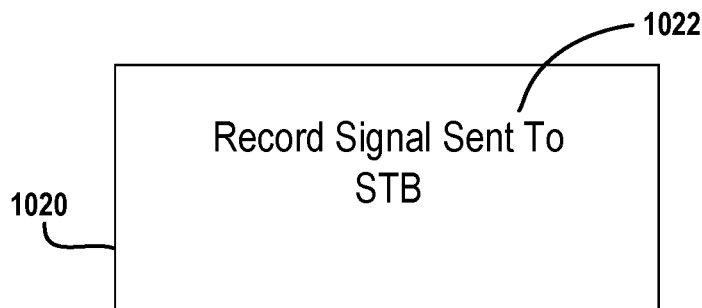
FIG. 10B is a screen display confirming a signal being sent to a set top box.

Referring now to FIG. 10B, when the record button 1016 is selected from FIG. 10A, a record message 1022 may be generated at a screen display 1020 indicating that a record signal has been sent to the set top box.

Figure 10C:
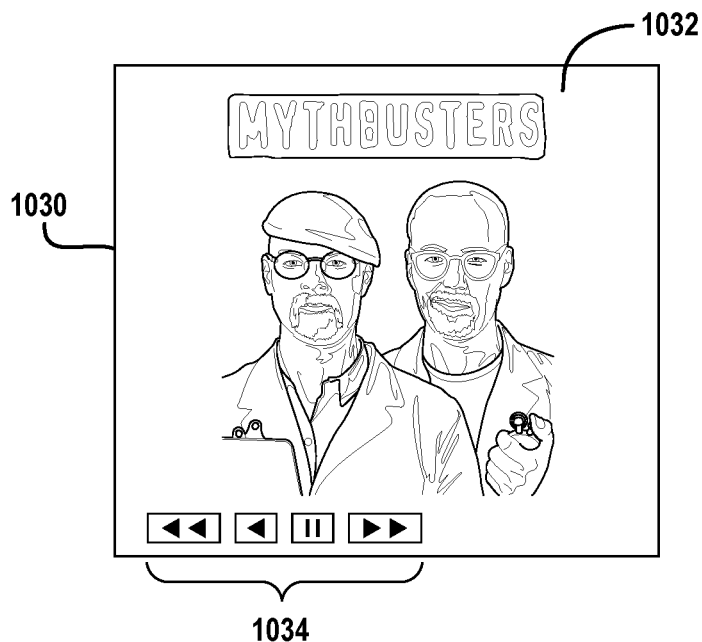
FIG. 10C is a screen display tuning to content being streamed.

Referring now to FIG. 10C, when the tune selector button 1014 of FIG. 10A is selected, a screen display 1030 may be changed and the content may be streamed to the in-vehicle infotainment system, the mobile or wearable device and generated in the screen display 1030. The content 1032 is displayed in the screen display. Action keys 1034 may be used for controlling the content. Forward, reverse, play and pause may be part of the action keys.

Figure 11:
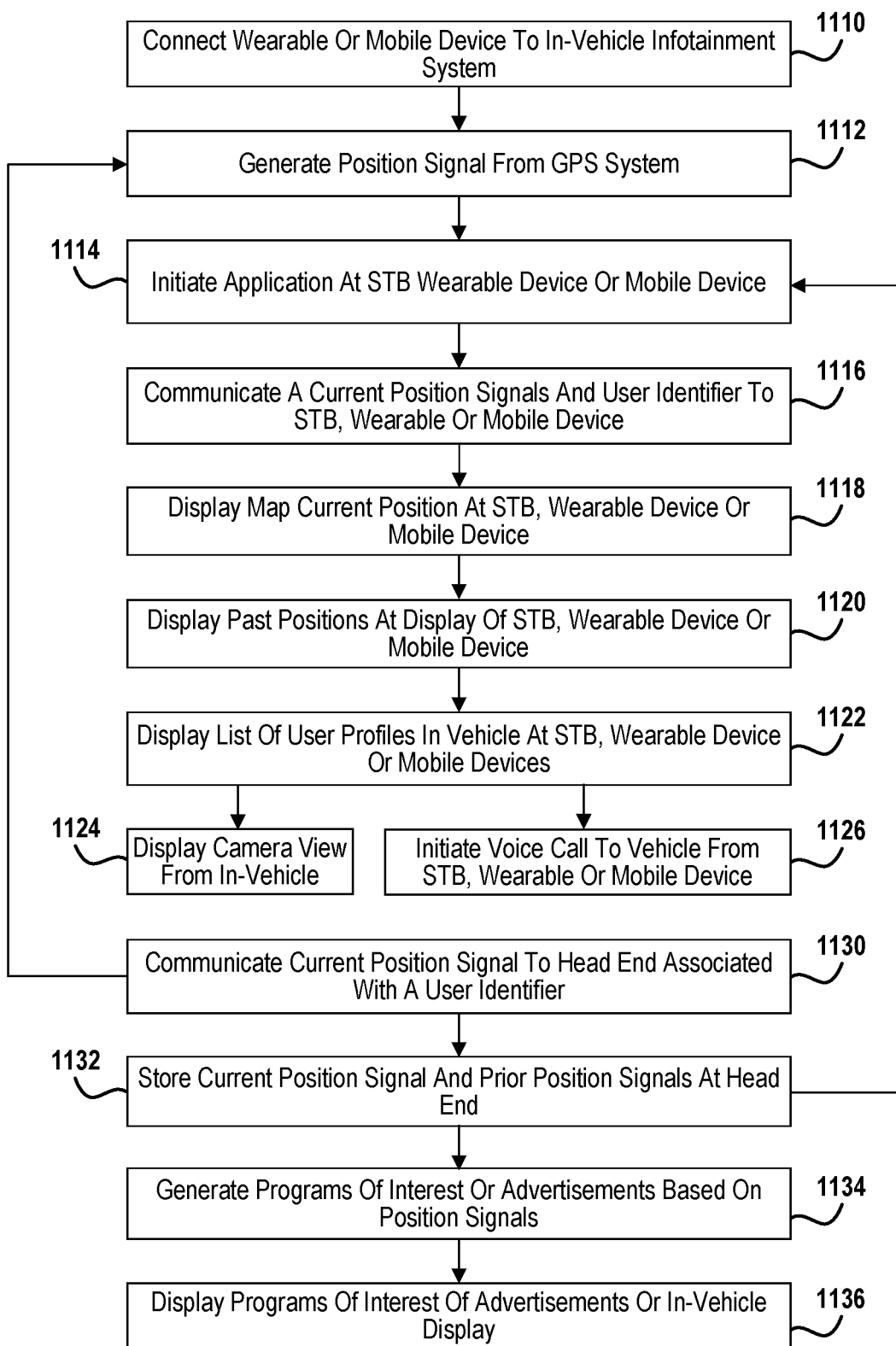
FIG. 11 is a flowchart of a method for tracking the position of a vehicle.

Referring now to FIG. 11, a flow chart of a method for tracking a vehicle using the system 10 illustrated in FIG. 1 is set forth. In step 1110, the wearable or mobile device is coupled to the in-vehicle infotainment system. This process is detailed above in that a user device or user identifier may be communicated to the in-vehicle infotainment system. In step 1112, a position signal is generated from a global positioning system within the vehicle. As mentioned above, the global positioning system may be located within the in-vehicle infotainment system, or within the vehicle. A GPS system may also be located within the wearable or mobile device. In step 1114, an application such as the location application 180 of the set top box or user receiving device 22 may be initiated. The user receiving device 22 may also be but is not limited to a home media center, a set back box or an integrated gateway device. In step 1116, a current position signal may be communicated along with a user identifier to the set top box or wearable or mobile device, initiating the location application. In step 1118, a map display displaying the current position of the in-vehicle infotainment system is generated. The display of the map may be initiated at the set top box, wearable device, or mobile device. This may allow, for example, a parent to view the current position of a child within the vehicle while watching television at the set top box, or streaming content to a mobile device. In step 1120, past positions may also be displayed at the set top box or wearable device. Past positions for a predetermined amount of time before the initiation of the application in step 1114 may also be communicated to the set top box, wearable or mobile device. Past positions may also be displayed only after initiation of the application. In this manner, the system may receive many current positions over time. Old current positions then become past positions.

In step 1122, a list of user profiles connected to the in-vehicle infotainment system may be displayed at the display at the set top box, wearable device or mobile device. In this manner, a list of occupants in the vehicle may thus be generated. In step 1124, a display of a camera view from in the vehicle. The camera view may display all of the occupants within the vehicle. In step 1126, a voice-over-IP call may be initiated from the set top box, wearable or mobile device to the vehicle. The voice signal may be a voice-over-IP signal and communicated through the network 50 described above.

After step 1112, step 1130 may communicate current position signals to the head end associated with the user identifier. The user identifier may be a user device identifier or some type of account identifier. In step 1132, the current position signal and prior position signals may be stored at the head end. After step 1132, the application may be initiated in step 1114 as described above. In this manner, the head end may store a plurality of position signals to show positions of the vehicle. After step 1132, step 1134 generates programs or advertisements of interest based on the position signal. The position or location of the vehicle may be communicated to the head end as a location signal so that appropriate advertisements and content may be communicated to or recommended to the user at the in-vehicle infotainment system. In step 1136, the programs of interest or advertisements are displayed on the in-vehicle display. The advertisements may be banner advertisements on the in-vehicle display. Content may be displayed after selection may be acted upon as a recommendation as described above.

Figure 12A:
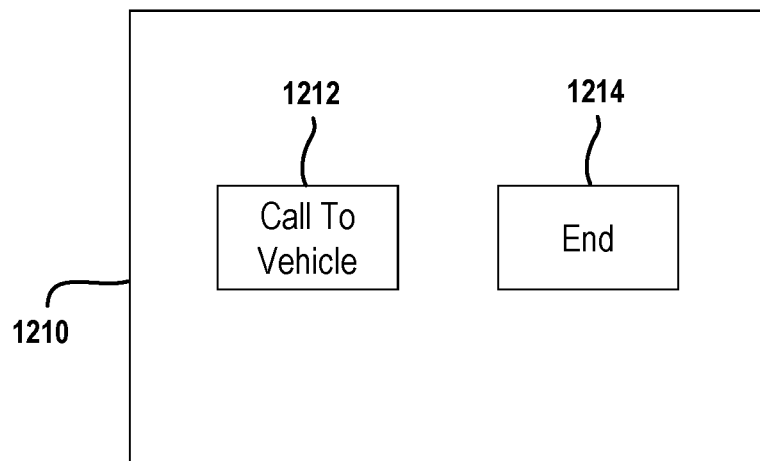
FIG. 12A is a screen display for making a voice-over-IP call to a vehicle.

Referring now to FIG. 12A, a call to a vehicle may be initiated from the set top box or mobile device. This may be performed through the application initiated in step 1114. A call button 1212 may be initiated through the application whereby a VOIP signal may be communicated from the set top box to the vehicle. The microphone at the set top box may receive audible signals and communicate the audible signals to a VOIP signal when the call is to be ended. A button 1214 may be activated to end the call.

Figure 12B:
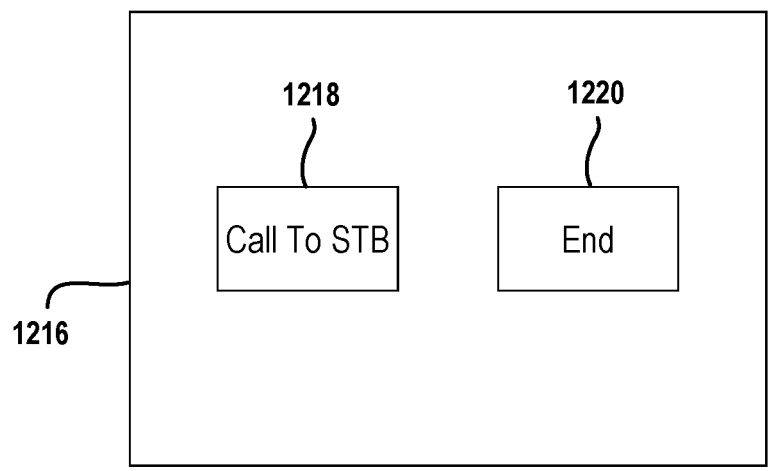
FIG. 12B is a screen display for calling to a set top box.

Referring now to FIG. 12B, a screen display 1216 is illustrated for initiating a call to the set top box. A call button 1218 is used for calling the set top box from the in-vehicle infotainment system. A microphone may be used for receiving the audible signals in a manner similar to making a regular phone call through a wireless network. The in-vehicle application may generate a VOIP signal from the audible signal and communicate the signal to the set top box through the network 50. An end button 1220 may be selected to end the call to the set top box.

Figure 13:
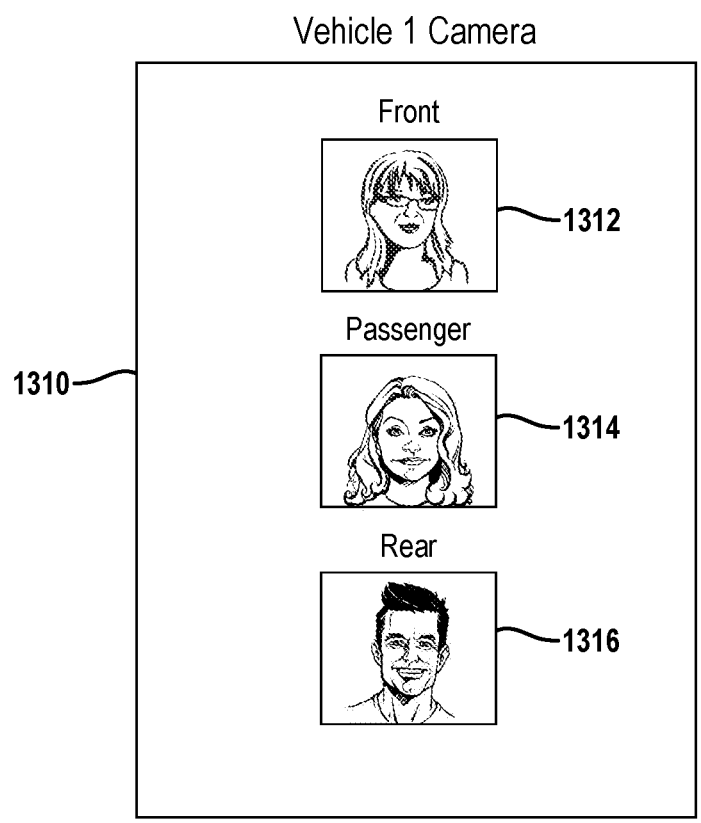
FIG. 13 is a screen display for displaying cameras from within the vehicle.

Referring now to FIG. 13, the vehicle cameras may be displayed at a screen display 1310 at a set top box. The display 1310 illustrates a front vehicle camera illustrating a front passenger, a screen display 1314 displays a side front passenger, and a rear camera may display a rear passenger.

Figure 14:
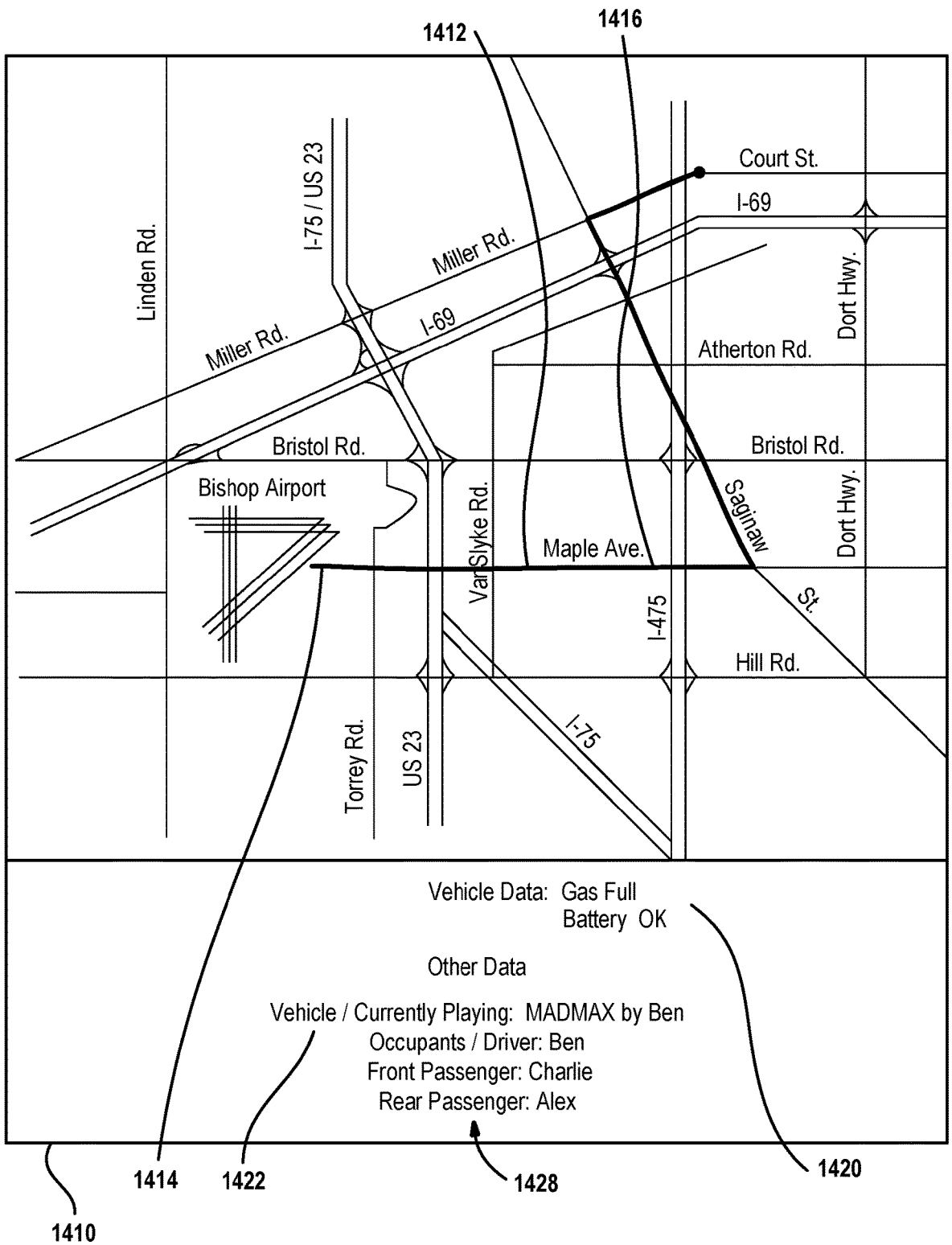
FIG. 14 is a screen display illustrating a traveled map of the vehicle.

Referring now to FIG. 14, a screen display 1410 illustrating a map with vehicle positions 1412 displayed thereon is set forth. The screen display 1310 may be displayed over currently playing content from the set top box. The map may be the display of the map described in steps 1118 and 1120.

A current position 1414 may be illustrated along with the past positions 1416 illustrated in bold. The display data may be communicated from the in-vehicle infotainment system to the head end or directly to a set top box for display. Vehicle data may include various data such as the amount of gas available, the state of charge of the battery, and other data. The other data may be selected from the various on board diagnostic data available within the vehicle. The other data may be predetermined by the system designers. A video playing portion 1422 may also display the content being viewed within the in-vehicle system. If more than one content is being used, multiple content may be displayed in the currently playing portion 1422. User identifiers corresponding to the content may also be displayed. A list of occupants 1428 may also be displayed. In this example, Ben, Charlie, and Alex are in the vehicle. The occupant's position may also be displayed adjacent to their respective user identifiers (names in the present example).

Figure 15:
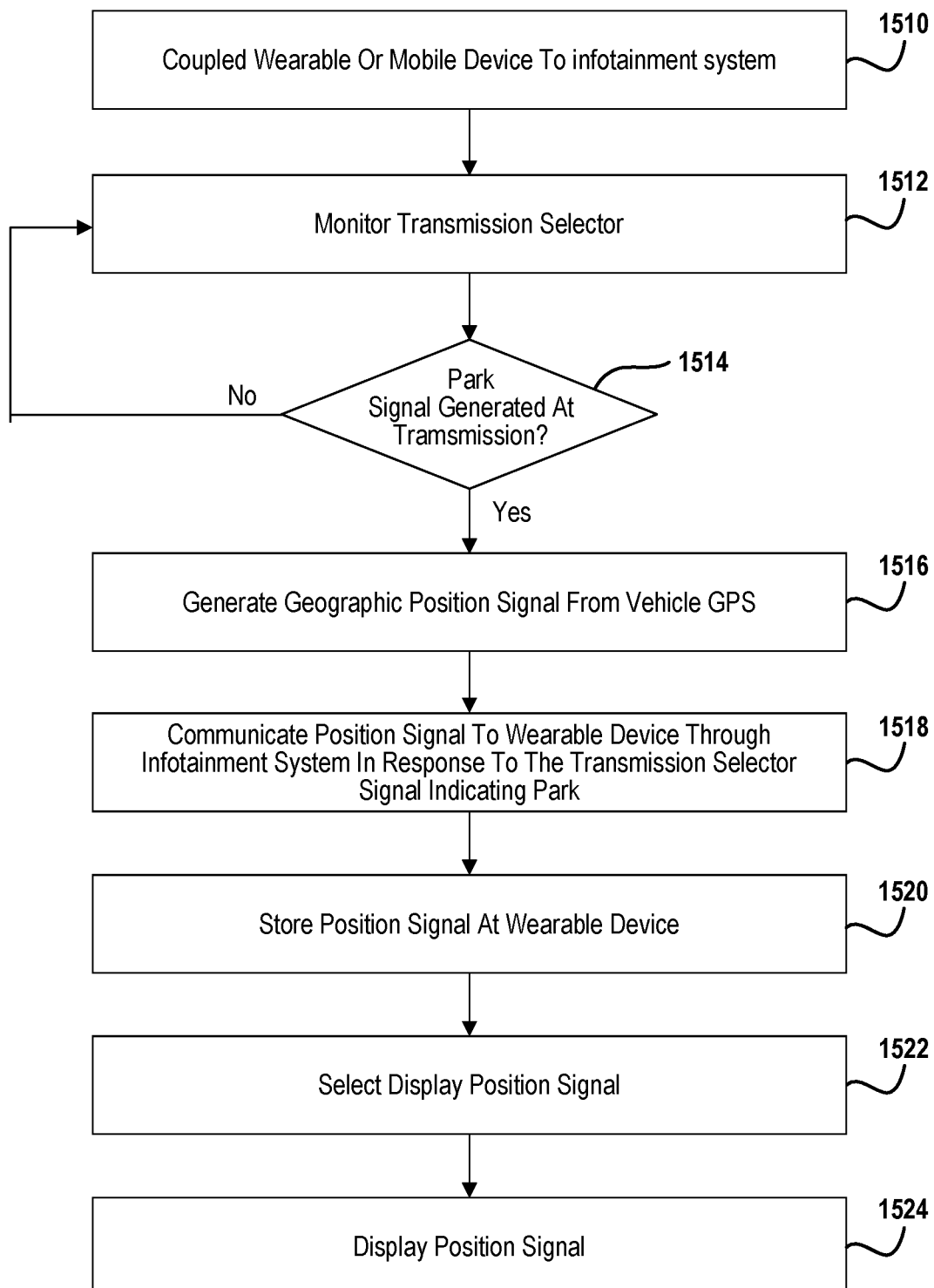
FIG. 15 is a flowchart of a method for storing a position of a vehicle.

Referring now to FIG. 15, a method of determining the position of a vehicle from a wearable device or mobile device is set forth. In step 1510, the wearable device or mobile device is coupled to the in-vehicle infotainment system. In step 1512, the transmission selector of the vehicle is monitored at the infotainment system. A transmission selector signal is communicated to the in-vehicle infotainment system. In step 1514, the in-vehicle infotainment system determines whether a park signal is generated at the transmission. That is, the in-vehicle infotainment system monitors the transmission selector signal to determine whether the transmission selector signal is indicative of a park position. The park position may be a button position or gear shift lever position If the transmission selector signal is not a park signal, then step 1512 is repeated. In step 1514 when the transmission selector signal is a park signal, step 1516 generates a geographic position signal from the vehicle global positioning system. In step 1518, the position signal is communicated to the wearable device through the infotainment system in response to the transmission selector signal indicating the vehicle is in park.

The position signal is stored at the wearable device in step 1520. The wearable device may have a screen display that may be selected to display the position signal in step 1522. In step 1524, the parked position of the vehicle is displayed.

Figure 16A:
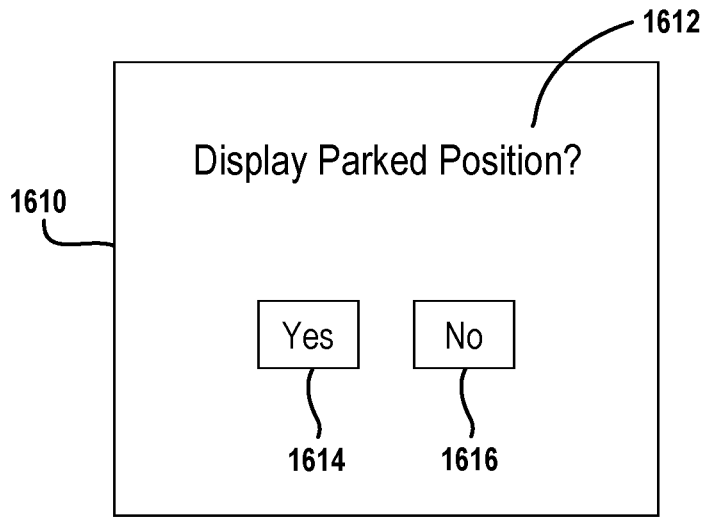
FIG. 16A is a screen display displaying a parked position query to determine whether a user would like to determine the parked location of the vehicle.

Referring now to FIG. 16A, a screen display 1610 displays a query 1612 that questions whether a parked position is to be displayed. Selector buttons 1614 and 1616 may be displayed. Button 1614 corresponds to an affirmative or "yes" decision for displaying the parked position of the vehicle. Button 1616 corresponds to a "no" or negative selection for displaying the parked position.

Figure 16B:
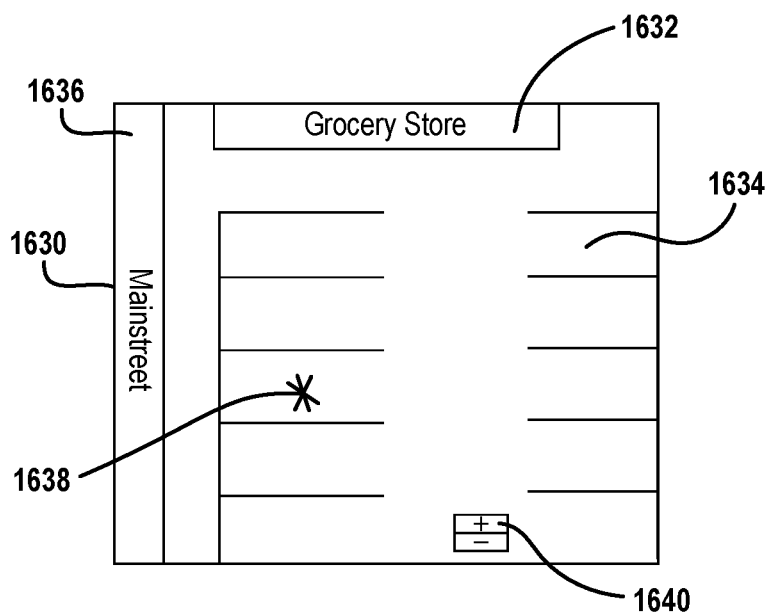
FIG. 16B is a screen display illustrating a map with a parked position of the vehicle.

Referring now to FIG. 16B, one example of a vehicle position is illustrated in screen display 1630. The screen display 1630 may correspond to a map indicating a building 1632 and parking spaces 1634. A street 1636 may also be displayed. Of course, various types of screen displays may be generated as well as various types of terrain or physical features. The vehicle position indicator 1638 indicates the vehicle position within the screen display 1630. Various types of indicators may be used for the screen display.

A scaling button 1460 may be used to scale the map larger or smaller by selecting the plus (+) or minus (−) within the scaling button 1640.

Figure 17:
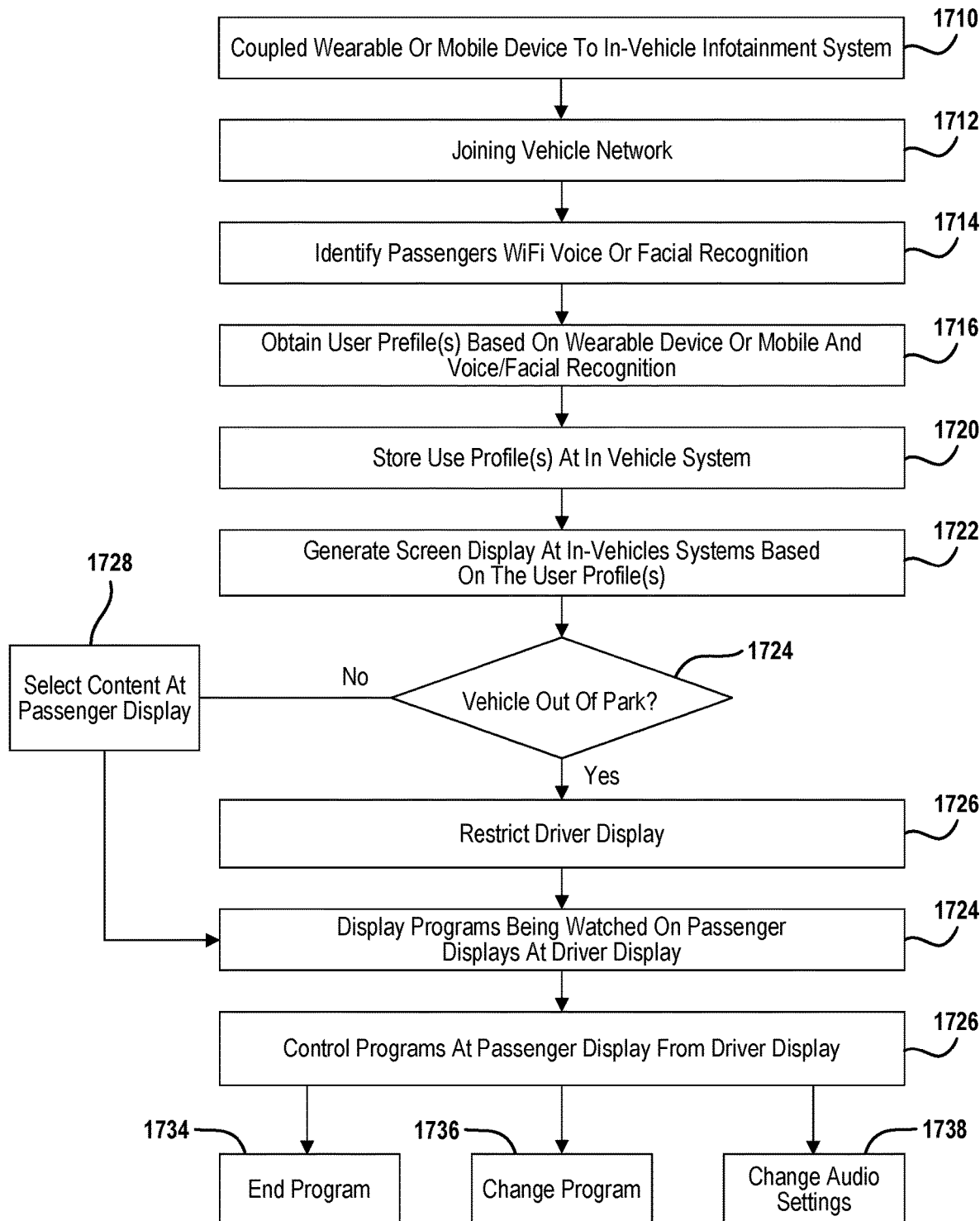
FIG. 17 is a flowchart of a method for operating the in-vehicle infotainment system according to user profiles.

Referring now to FIG. 17, a method for operating the in-vehicle infotainment system using intelligent profiling is set forth. In step 1710, the wearable device or mobile device, or devices, are coupled to the in-vehicle infotainment system. In step 1712, the wearable devices or mobile devices join the in-vehicle network. As mentioned above, the in-vehicle network may be a local area network using the in-vehicle infotainment system as a router. In step 1714, passengers are identified with voice or facial recognition. Recognition may take place within the in-vehicle system, or may take place in conjunction with the head end. User device identifiers may be communicated to the in-vehicle system to facilitate identification. In response to identifying the passengers, step 1716 obtains a user profile or profiles based upon the wearable or mobile device identifiers and voice and/or facial recognition. In step 1720, the user profiles are stored at the in-vehicle infotainment system. In step 1722, a screen display is generated at the in-vehicle infotainment system based on the user profiles. As mentioned above, the in-vehicle infotainment system may be in communication with various numbers of screen displays. For example, two or more screen displays may be located in the rear seating positions, while a primary screen display is located in the front of the vehicle.

In step 1724, it is determined whether the vehicle is out of park. This is determined using the transmission selector signal described above. When the vehicle is out of a parked position and potentially above a predetermined speed such as 5 miles per hour, step 1726 restricts the driver display. The driver display may be restricted by not presenting video, restricting access to various buttons, or not allowing various features. In step 1724 when the vehicle is not out of a parked position, content may be selected at a passenger display. In step 1730, the content titles are displayed on the passenger display and are displayed at the driver display. The content itself may not be displayed, but rather the content titles and other information may be displayed at the driver display. In step 1732, the programs are controlled at the passenger display from the driver's display. In step 1734, various buttons or selectors may be used to control various aspects of the passengers' viewing experience. The driver may choose to end the program in step 1734. This may be performed by selecting various screen display buttons. The driver may also change the program in step 1736. That is, another program may be selected for the passenger displays to be displaying. This may be useful for a parent to help a child select another program.

After step 1732, the audio settings may also be changed in step 1738. The audio settings may be changed by changing the volume, changing to the use of headphones or the like.

Figure 18A:
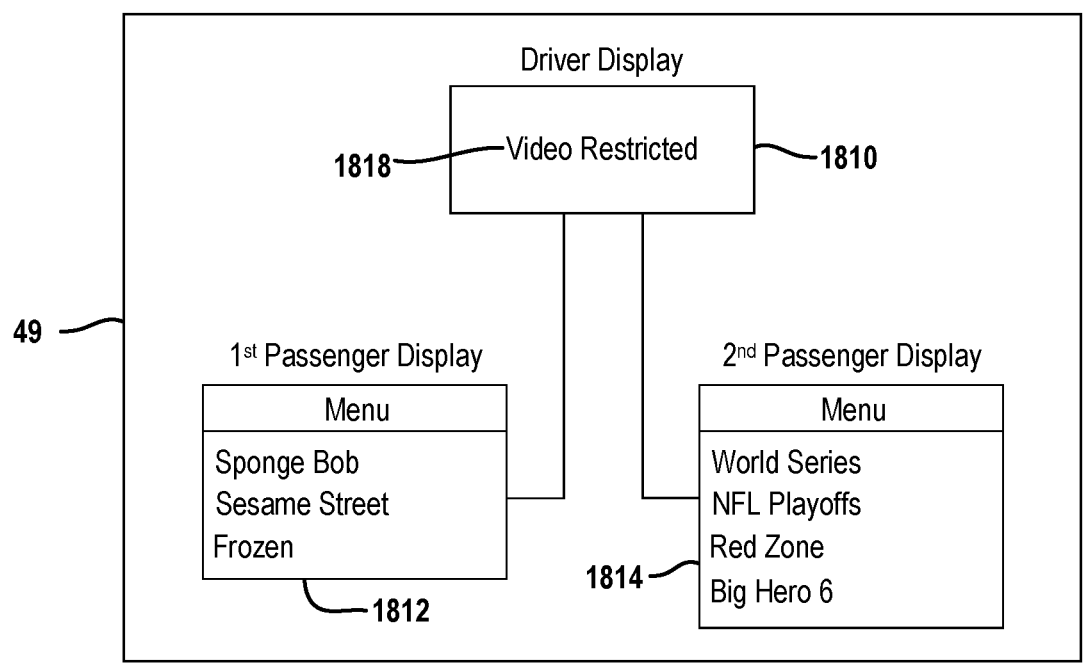
FIG. 18A is a block diagrammatic view of screen displays coupled to the in-vehicle infotainment system having various displays.

Referring now to FIG. 18A, a representation of the display 49 associated with a driver display 1810 is illustrated relative to a first passenger display 1812 and a second passenger display 1814. In this example, a "video restricted" message 1818 is displayed on the driver display 1810. This prevents the driver from watching video and being distracted while driving. As mentioned above, whether or not the vehicle is driving may be determined by the transmission selector signal being in park or out of park.

The first passenger display 1812 is illustrated providing three different menu options. The menu options may be chosen based upon the user profile identified with the user using the first passenger display. The second passenger display 1814 is displaying a menu that includes different content titles from those being displayed at the first passenger display 1812. The second passenger display may also be configured based upon a user profile. However, the second passenger display 1814 may be changed based upon a second user profile. The second user profile is determined from identifiers from the wearable or mobile devices, the voice recognition or visual recognition of the user of the second passenger display 1814 as described above in FIG. 17. In the present example, the first passenger display is displaying a menu corresponding to "SpongeBob®", "Sesame Street®" and "Frozen®". The second passenger display 1814 is displaying a menu with "World Series®", "NFL Playoffs®", "Red Zone®" and "Big Hero 6®".

Figure 18B:
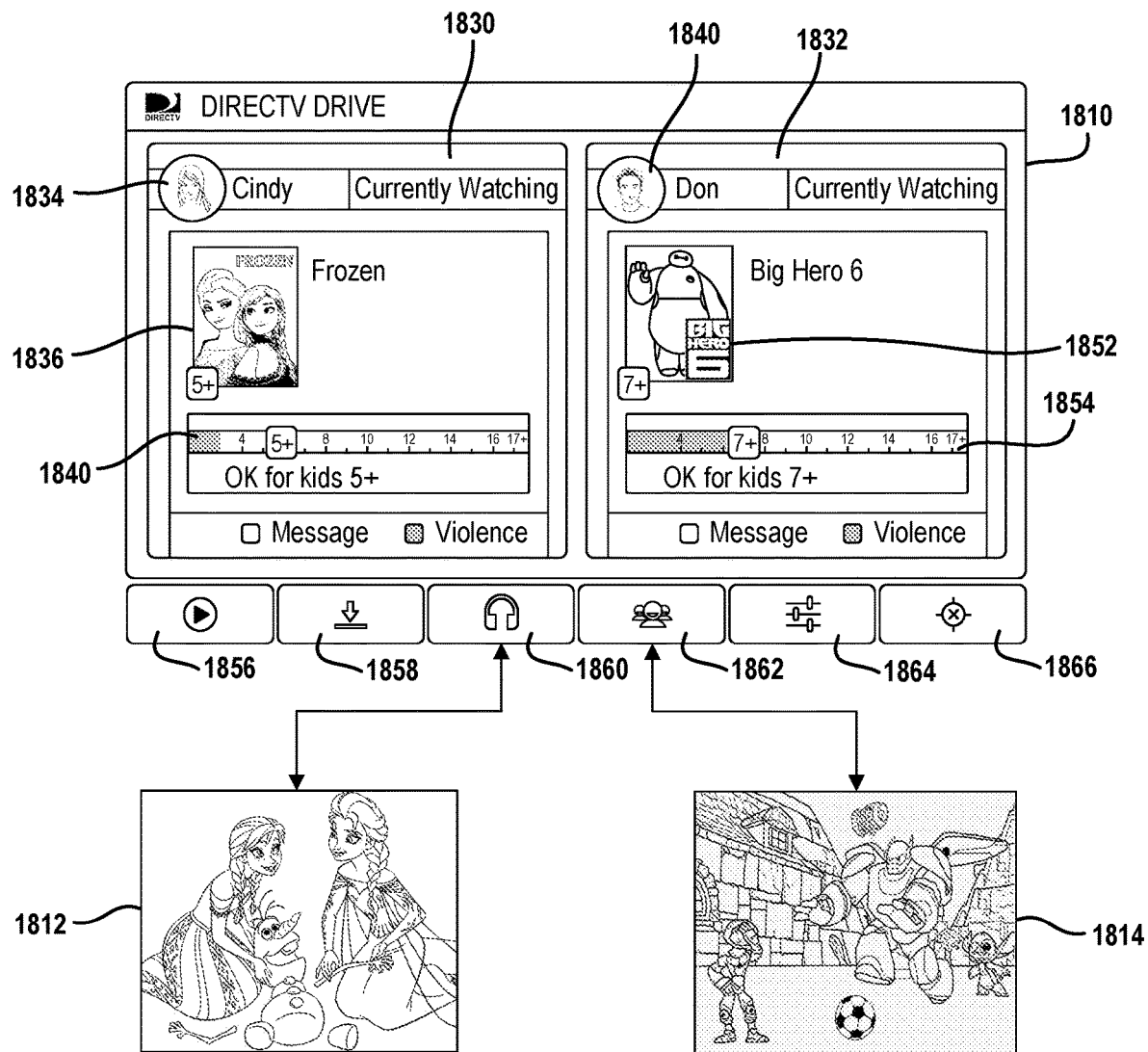
FIG. 18B illustrates screen displays with a primary display controlling the secondary displays.

Referring now to FIG. 18B, the screen displays 1810, 1812 and 1814 are illustrated after selection from the new display that the first passenger display is selected and a selection from the second passenger display 1814 is selected. In this example, the first passenger display 1812 is displaying "Frozen®". The second passenger display 1814 is displaying "Big Hero 6®".

In this example, the driver display 1810 illustrates a first screen display portion 1830 and a second screen display portion 1832 corresponding to the first passenger display 1812 and the second passenger display 1814. The first screen display portion 1830 displays a user identifier 1834 and a content identifier 1836. In this example, the content identifier 1836 includes a title and a "poster" corresponding to the movie being displayed at the first screen display 1812. A rating bar 1840 may also be displayed on the display corresponding to a potential rating. The content identifier 1836 corresponds to the content currently being watched at the first screen display 1812.

The second screen display portion 1832 also displays a second user identifier 1850, a second content identifier 1852 and the ratings display 1854.

Various control buttons such as a play button 1856, a download button 1858, a headphone button 1860, a user selection button 1862, a setting adjustment button 1864 and an end button 1866 is set forth. The play button 1856 may be used for initiating the playback of a content at a selected user display. By selecting button 1858, content may be downloaded to the in-vehicle infotainment system. Button 1860 may be used for changing the audio to a headphone setting. The users displayed at the driver screen display 1810 may be changed by selecting the button 1862. Various audio and video settings may be changed by selecting the button 1864.

Figure 19:
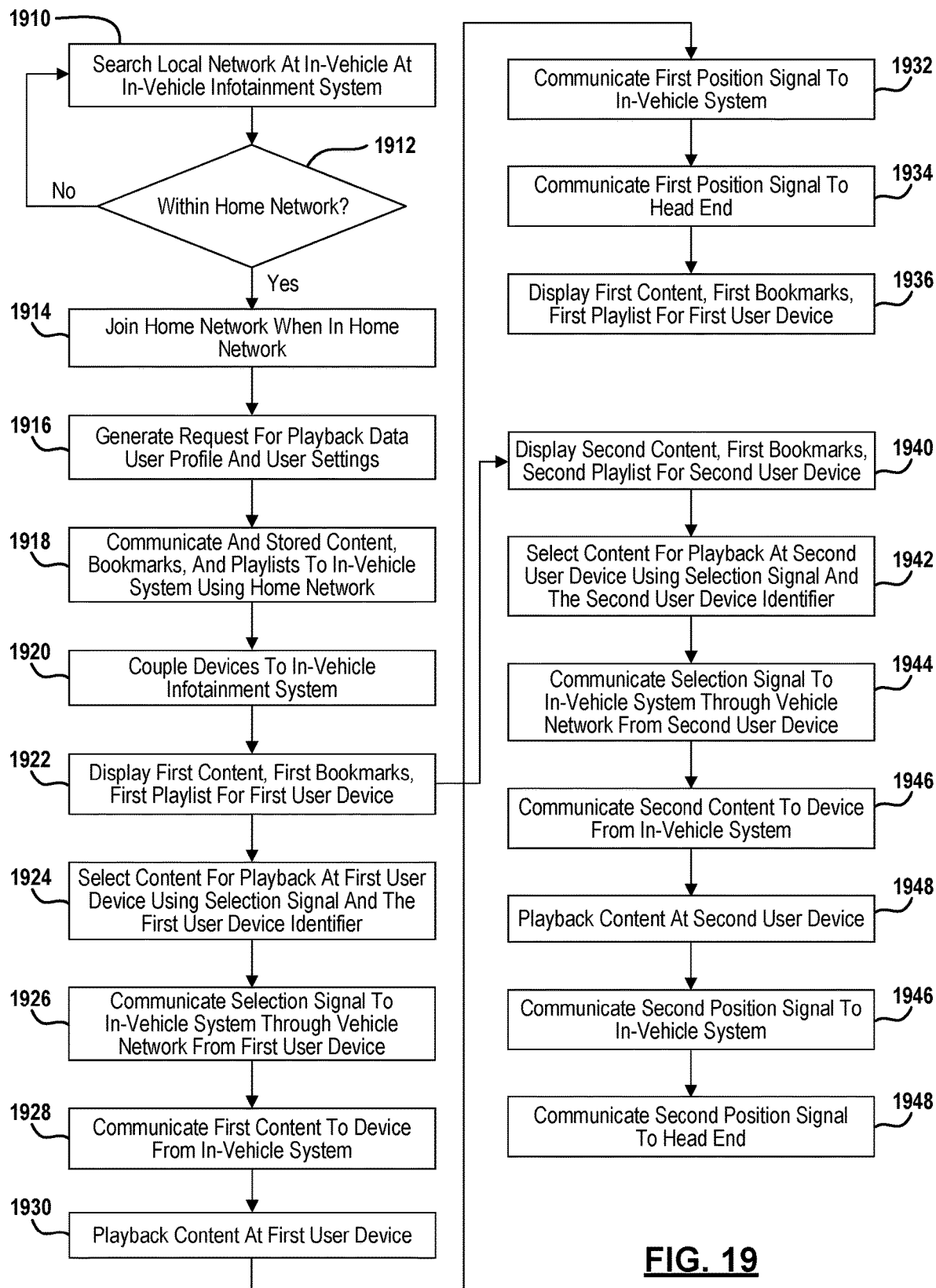
FIG. 19 is a flowchart of a method for operating different screen displays according to user profiles.

Referring now to FIG. 19, a method for synchronizing the in-vehicle infotainment system with a set top box and operating the system is set forth.

In step 1910, local networks are searched at the in-vehicle infotainment system. In step 1912, it is determined whether the in-vehicle infotainment system is within range of the home network. The home network connection may be established by presetting the password in the in-vehicle infotainment system. If the system is not within the home network, step 1910 is again executed.

After step 1912 and the in-vehicle infotainment system is within the home local area network, the home network is joined in step 1914. In step 1916, a request for playback data, a user profile and user settings is generated by the in-vehicle infotainment system in step 1916. The request signal in step 1916 may be for all users of the in-vehicle infotainment system. The data may also be obtained for all past users of the in-vehicle infotainment system. That is, it is likely that the past users correspond to the users of the set top box or the like. Thus, when step 1916 generates a request signal for playback data, the users of the set top box within the home may be the same as the users of the in-vehicle infotainment system. In this manner, the in-vehicle infotainment system may be kept up to date with content data. The request signal may include an in-vehicle infotainment system identifier, a user identifier or user identifiers. A data identifier may also be communicated to obtain a specific type of data. The playback data from step 1916 may include a list of playback content as well as the actual content. In step 1918, the content, the bookmarks and playlists for each user of the in-vehicle infotainment system and the set top box within the home are communicating with the in-vehicle infotainment system through the home network. The content may also be stored in the in-vehicle infotainment system in step 1918. In step 1920, mobile and wireless devices may be coupled to the in-vehicle infotainment system. This may be performed by communicating a device identifier from the wearable or mobile device to the in-vehicle infotainment system.

In step 1922, the various data obtained from the home system may be displayed. For example, content, bookmarks and a display list corresponding to the first user device may be displayed at a first display within the in-vehicle infotainment system.

In step 1924, content may be selected for playback at the first user device using a selection signal and the first user device identifier. In step 1926, a selection signal is communicated to the in-vehicle infotainment system from the first user device. In step 1928, content is communicated to the first device from the in-vehicle system. The requested content is played back at the first user device in step 1930. A position signal may be communicated to the in-vehicle system in step 1932. The position signal may be communicated to the head end in step 1934. By communicating the position signal, the position of the content may ultimately be saved and used to resume content at another device so that playback may resume at or near the position left off in the in-vehicle system. It should be noted that wearable devices, mobile devices and in-vehicle screens may be used for requesting content and playing back content within the in-vehicle network.

Referring back to step 1922, content may be displayed at a second user device within the in-vehicle system in step 1940. The second content, second bookmarks and second playlists may all be displayed, which are different than those displayed in step 1922. However, some of the elements within the lists may be the same. In step 1942, content selection for the second user device may be selected for playback. In step 1944 the selection signal may be communicated to the in-vehicle system through the in-vehicle network. In step 1946, content may be communicated to the second device within the in-vehicle infotainment system. Steps 1948 through 1952 correspond directly to steps 1930 through 1934, except that the content is played back at the second user device and the position signal corresponds to the position of the second content.

Figure 20:
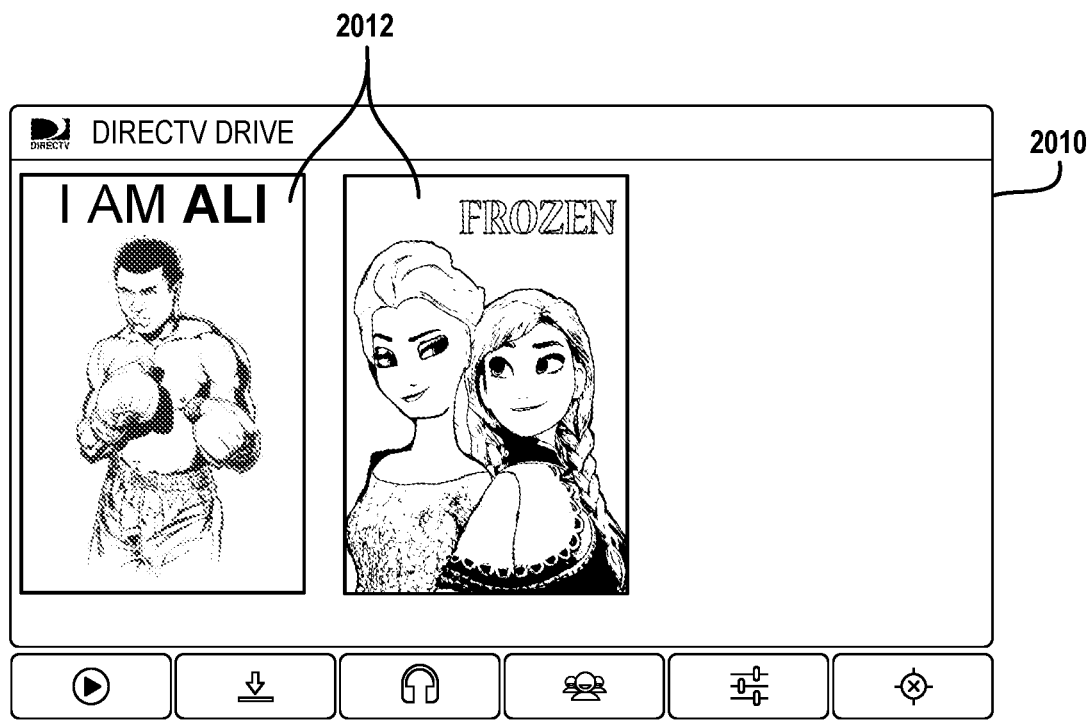
FIG. 20 is a screen display illustrating content available that was communicated from a set top box.

Referring now to FIG. 20, a screen display 2010 illustrating content posters 2012 corresponding to content stored within the in-vehicle infotainment system is set forth. In this example, the posters 2012 correspond to content corresponding to a first user of the in-vehicle infotainment system. It should be noted that the content may be communicated from a set top box, a home media center or a gateway.

Figure 21:
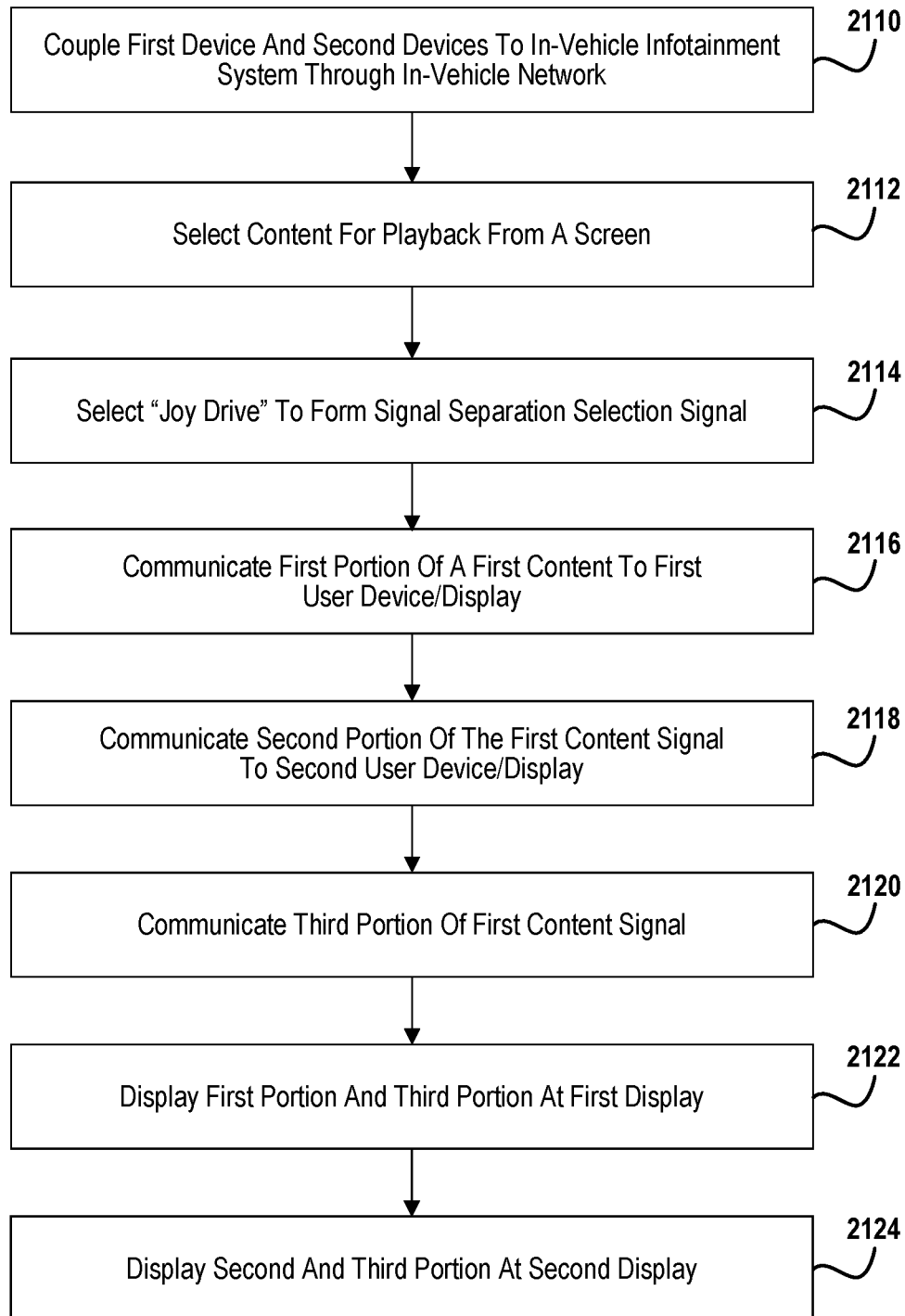
FIG. 21 is a flowchart of a method displaying different portions of a content signal.

Referring now to FIG. 21, a method for displaying different portions of the same content signal is set forth. In step 2110, a first device and second device are coupled to the in-vehicle infotainment system through an in-vehicle network. The system may include dedicated displays provided within the in-vehicle system or may include devices such as a wearable device or mobile device that are brought in to the in-vehicle network.

In step 2112, content is selected for playback from a screen display. The screen display may be one of the screen displays associated with the in-vehicle system or from a mobile or wearable device. A screen display may list a plurality of content therein. In step 2114, selecting a "joy drive" button to form a signal separation selection signal may be performed. By selecting signal separation, portions of the signal such as the audio portion and a data portion may be separated and displayed on separate parts of the screen as will be described below. By forming a signal separation selection signal, the in-vehicle infotainment system may allow a karaoke-type playback for content. That is, one user may view the lyrics of the song while another user views a video without the lyrics. Both of these displays may generate the music while the lyrics may be sung by an occupant.

In step 2116, a first portion of the signal is communicated to a first user device or display through the in-vehicle network. In step 2118, a second portion of the first content signal is communicated to a second user device through the in-vehicle network. In step 2120, a third portion of the first content signal is communicated to the first user device or display and the second user device or display through the in-vehicle network. This may, for example, correspond to the music of a song-based content. In step 2122, the first portion of the content and the third portion are displayed at the first display. In step 2124, the second portion and the third portion are displayed at the second display.

Figure 22:
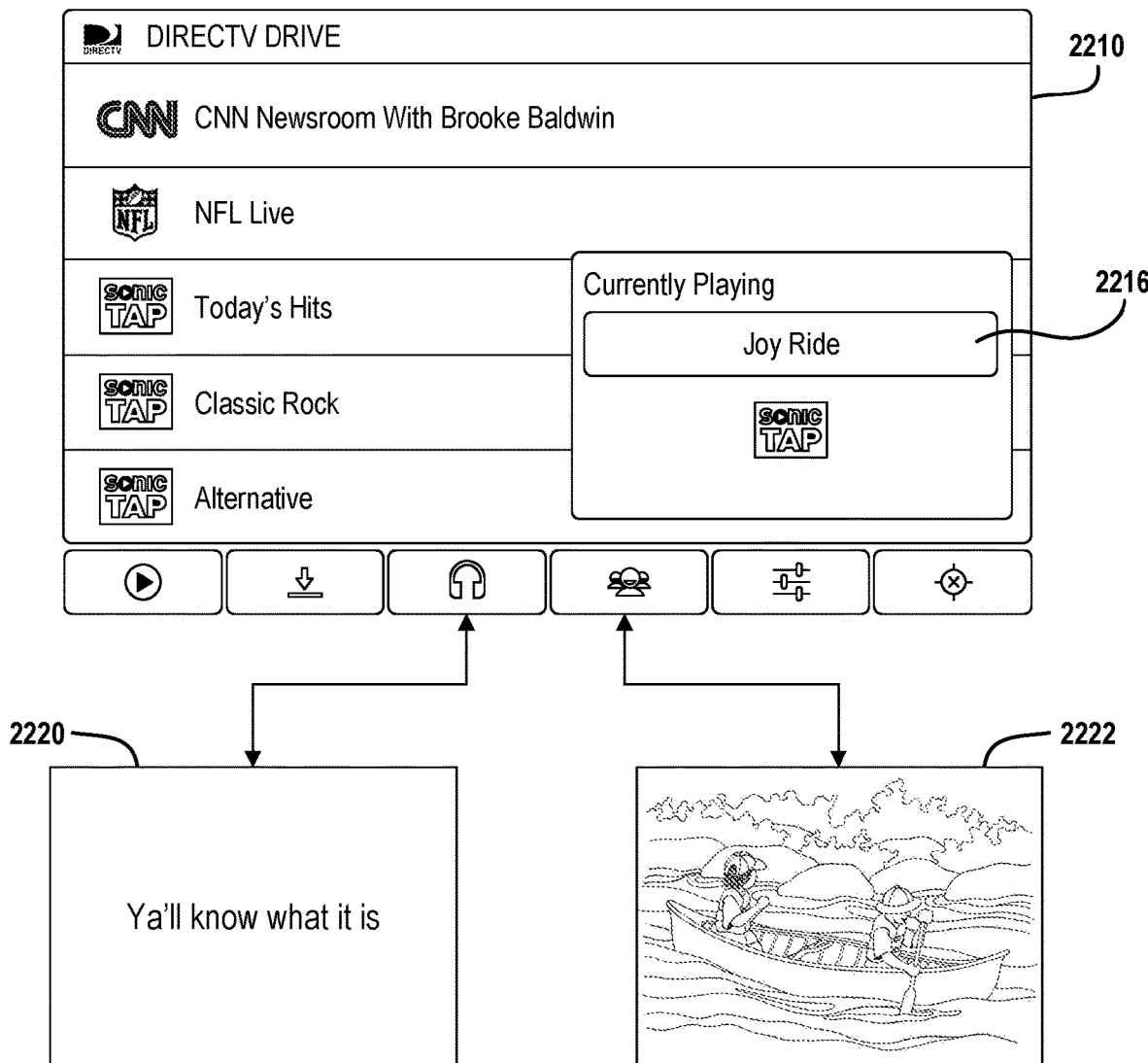
FIG. 22 is a screen display for the screens with an in-vehicle infotainment system having different portions of the content signal displayed at different devices.

Referring now to FIG. 22, a first screen display 2210 is illustrated having a plurality of content displayed thereon. Upon selection of one of the content in the list, a window 2216 may be generated. The window 2216 may correspond to a "joy drive" selection button used for selecting a karaoke-type display of the content. In this example, "Sonictap®" is a music station for broadcasting music. The signal from the music station may include lyrics and/or a video. A first screen display 2220 displays the lyrics associated with the content selected. A second screen display 2222 displays a video without the lyrics corresponding to the content selected. Of course, the lyrics may be displayed over the video itself. However, the lyrics are not displayed on both displays 2220 and 2222.

Figure 23:
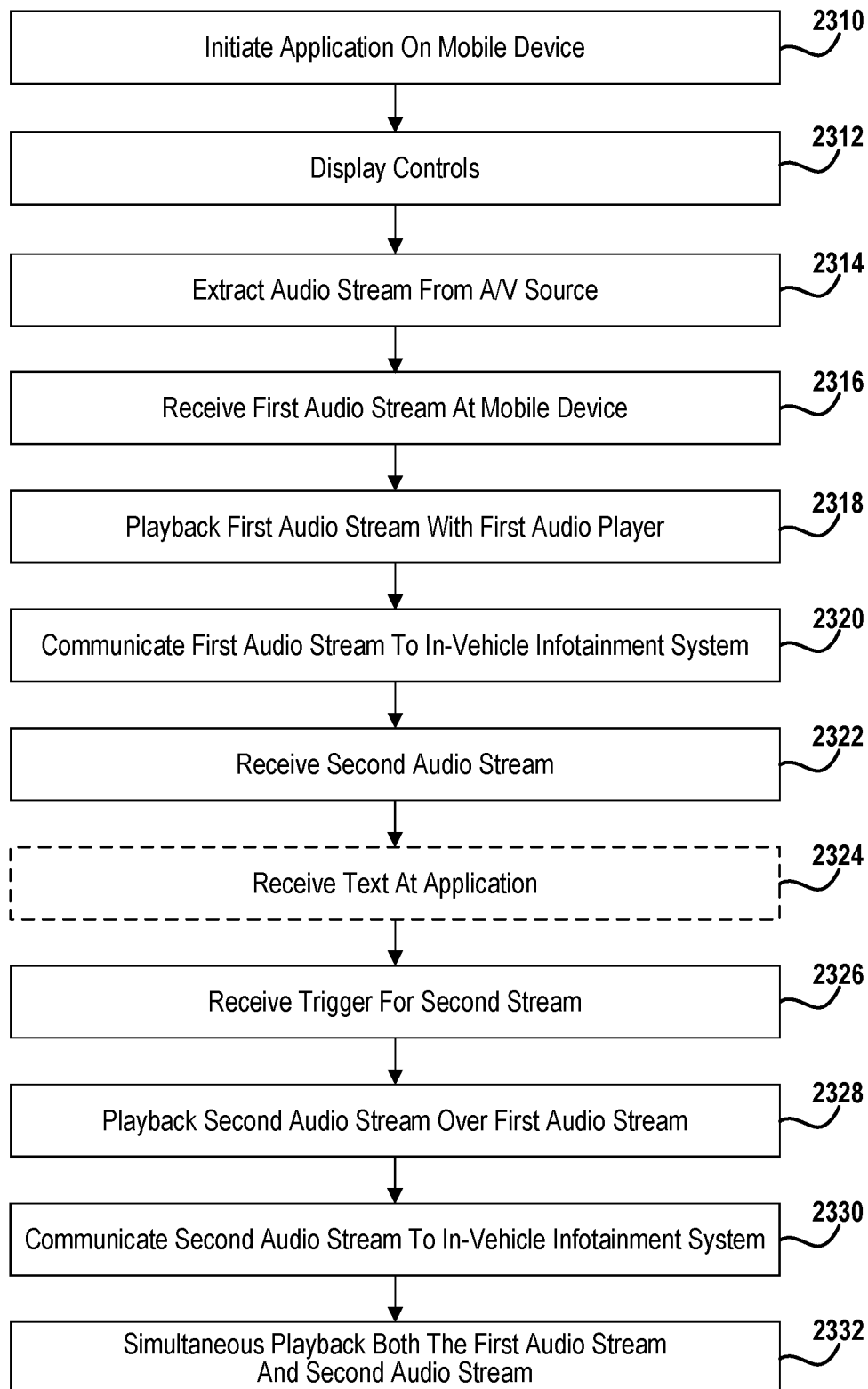
FIG. 23 is a flowchart of a method for operating an in-vehicle infotainment system using a broadcasted audio-video signal and playing back the enhanced audio signal at an in-vehicle infotainment system.

Referring now to FIG. 23, a method of providing audible signals to an in-vehicle infotainment system is set forth. The method set forth in FIG. 23 may be used for providing the audio signals or enhanced audio signals to be audibly displayed through the in-vehicle infotainment system. In step 2310, an application is initiated at a mobile device. In step 2312, controls may be displayed at the mobile device and at the in-vehicle infotainment system. In step 2314, the audio stream is extracted from an audio-video source signal. In step 2316, the first audio stream is received at the mobile device from the extracted audio-video source signal. In step 2318, the first audio stream may be played back from the first audio player within the application. In step 2320, the first audio stream is communicated to the in-vehicle infotainment system. In step 2322, a second audio stream is received. The second audio stream may be received from various sources including from a secondary website. The second audio stream may be an advertisement signal or, as set forth in steps 2324 and 2326, from a text signal. In step 2324, the text signal may be received through the application. The text signal corresponds to an eventually formed audio stream. In the present example, the text signal may correspond to a description of a key play in a football game, for example. In step 2326, a trigger for the second audio stream may be received. The trigger may be received as part of the first audio signal, or may be received from a secondary source such as the content head end. In step 2328, the second audio stream is played back over the first audio stream so that both audio streams are communicated to the in-vehicle infotainment system as in step 2330. Communication in step 2330 may take place through Bluetooth® or through a physical wire coupling. Communication through the in-vehicle network may also take place since the mobile device may be in a local area network with the in-vehicle system. In step 2332, both the first audio stream and the second audio stream are simultaneously played back through the in-vehicle infotainment system.

Figure 24:
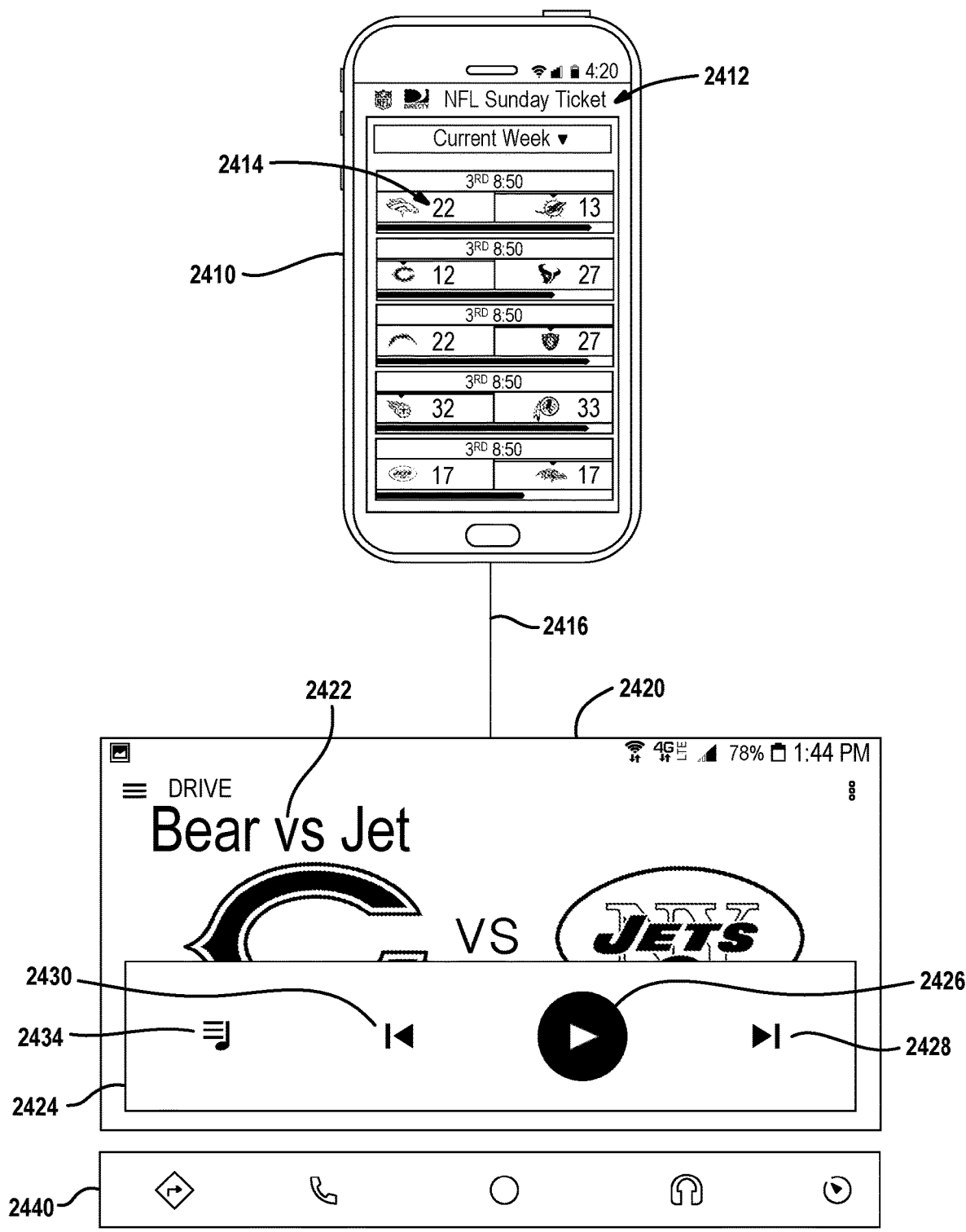
FIG. 24 shows screen displays at a mobile device and at an in-vehicle infotainment system that plays back an enhanced audio stream.

Referring now to FIG. 24, a mobile device 2410 is illustrated having a screen display 2412 corresponding to the user interface of an application. The application may detect when the mobile device 2410 is in the presence of an in-vehicle network. The screen display 2412 may display various sports scores 2414 for various games, such as NFL® games. A screen display 2420 of the in-vehicle infotainment system is illustrated coupled to the mobile device 2410 through a connection 2416. The connection 2416 may take place through the in-vehicle network (wired or wireless) or through Bluetooth® (or another localized communication format). The in-vehicle display 2420 displays a game title or program title 2422 for a game being communicated through the mobile device 2410. That is, the title 2422 corresponds to the title being streamed from the mobile device. As mentioned above, the mobile device 2410 may separate the audio and video streams so that the audio stream is communicated through the in-vehicle infotainment system. A control panel 2424 is used for controlling the audio stream. A playback button 2426, a forward button 2428 and a reverse button 2430 may be used. A tune button 2434 may be used to tune to different audio streams that may be provided through the mobile user device. A second control panel 2440 may be used to control other functions of the in-vehicle infotainment system.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   coupling a mobile device to an in-vehicle infotainment system;
   generating a blocking signal within the mobile device in response to coupling the mobile device to the in-vehicle infotainment system, said blocking signal enabling suppressing a displaying of a notification signal at the mobile device and enabling communication of the notification signal to the in-vehicle infotainment system;
   communicating the notification signal to the mobile device through a network;
   receiving the notification signal at the mobile device while suppressing displaying the notification signal at the mobile device in response to the blocking signal;
   communicating the notification signal from the mobile device to the in-vehicle infotainment system;
   displaying a notification based on the notification signal on a screen display of the in-vehicle infotainment system; and
   generating an unblocking signal within the mobile device in response to decoupling the mobile device and the in-vehicle infotainment system, said unblocking signal disabling suppressing the displaying of the notification signal at the mobile device, displaying a reminder signal corresponding to the notification being enabled in response to the blocking signal and disabling communication of the notification signal to the in-vehicle infotainment system.

2. The method of claim 1 wherein communicating the notification signal to the mobile device comprises communicating a content recording selector through the mobile device to the in-vehicle infotainment system, and displaying the content recordings selector on the screen display of the in-vehicle infotainment system.

3. The method of claim 2 further comprising generating a recording selector signal at the screen display of the in-vehicle infotainment system in response to selecting the content recording selector;

communicating the recording selector signal and an account identifier to a set top box through the mobile device; and in response to the recording selector signal storing content corresponding to the content recording selector in the set top box.

4. The method of claim 3 wherein communicating the recording selector signal and the account identifier to the set top box comprises communicating the recording selector signal and the account identifier to the set top box through a satellite.

5. The method of claim 3 wherein communicating the recording selector signal and the account identifier to the set top box comprises communicating the recording selector signal and the account identifier to the set top box through a head end and a satellite.

6. The method of claim 1 wherein communicating the notification signal to the mobile device comprises communicating a tune selector.

7. The method of claim 6 further comprising generating a tune selector signal in response to the tune selector and displaying a content through the in-vehicle infotainment system.

8. The method of claim 7 further comprising streaming the content to the in-vehicle infotainment system in response to the tune selector signal and further comprising communicating a vehicle position and a list of occupants to a set top box through the mobile device.

9. The method of claim 7 further comprising streaming the content to the in-vehicle infotainment system through the mobile device in response to the tune selector signal.

10. The method of claim 1 wherein communicating the notification signal comprises communicating a reminder signal comprising a tune selector and a record selector.

11. A system comprising:

an in-vehicle infotainment system coupling to a mobile device;

the mobile device comprising a processor and a memory storing instructions that, when executed by the processor of the mobile device, cause the mobile device to perform operations comprising:

generating a blocking signal therein in response with the in-vehicle infotainment system, said blocking signal enabling suppressing displaying a notification signal at the mobile device and enabling communication of the notification signal to the in-vehicle infotainment system;

receiving the notification signal while suppressing displaying a notification associated with the notification signal in response to the blocking signal;

communicating the notification signal to the in-vehicle infotainment system, wherein the in-vehicle infotainment system displays the notification signal on a screen display; and generating an unblocking signal therein in response to decoupling from the in-vehicle infotainment system, said unblocking signal disabling suppressing the displaying of the notification signal at the mobile device, displaying a reminder signal corresponding to the notification signal being enabled in response to the blocking signal and disabling communication of the notification signal to the in-vehicle infotainment system.

12. The system of claim 11 wherein the mobile device comprises a wearable device.

13. The system of claim 11 wherein the notification signal comprises a content recording selector.

14. The system of claim 13 wherein the in-vehicle infotainment system generates a recording selector signal in response to the content recording selector, communicates the recording selector signal and an account identifier to a set top box and in response to the recording selector signal, said set top box storing content corresponding to the content recording selector in the set top box.

15. The system of claim 14 wherein the in-vehicle infotainment system communicates the recording selector signal and the account identifier to the set top box through a head end.

16. The system of claim 14 wherein the in-vehicle infotainment system communicates the recording selector signal and the account identifier to the set top box through a head end and a satellite.

17. The system of claim 11 wherein the notification signal comprises a tune selector.

18. The system of claim 17 wherein the in-vehicle infotainment system communicates a tune selector signal in response to the tune selector and displays a first content at the in-vehicle infotainment system.

19. The system of claim 18 further comprising a head end streaming the first content to the in-vehicle infotainment system in response to the tune selector signal.

20. The system of claim 18 further comprising a head end streaming the first content to the in-vehicle infotainment system through the mobile device in response to the tune selector signal.

21. The system of claim 11 wherein the notification signal comprises a tune selector and a record selector.

* * * * *